United States Patent
Adams

(10) Patent No.: US 10,757,346 B1
(45) Date of Patent: Aug. 25, 2020

(54) SYSTEMS AND METHODS FOR VIDEO EXTRACTION AND INSERTION

(71) Applicant: FlixBay Technologies, Inc., Sunnyvale, CA (US)

(72) Inventor: Brian Eric Adams, Sunnyvale, CA (US)

(73) Assignee: FLIXBAY TECHNOLOGIES, INC., Sunnyvale, CA (US)

( * ) Notice: Subject to any disclaimer, the term of this patent is extended or adjusted under 35 U.S.C. 154(b) by 78 days.

(21) Appl. No.: 15/962,937

(22) Filed: Apr. 25, 2018

Related U.S. Application Data

(60) Provisional application No. 62/491,389, filed on Apr. 28, 2017.

(51) Int. Cl.
  *H04N 5/272* (2006.01)
  *G06K 9/00* (2006.01)
  *H04N 9/74* (2006.01)

(52) U.S. Cl.
  CPC ......... *H04N 5/272* (2013.01); *G06K 9/00765* (2013.01); *H04N 9/74* (2013.01)

(58) Field of Classification Search
  CPC ....... H04N 5/272; H04N 9/74; G06K 9/00765
  See application file for complete search history.

(56) References Cited

U.S. PATENT DOCUMENTS

| | | | |
|---|---|---|---|
| 4,849,810 A * | 7/1989 | Ericsson | G06T 9/008 375/240.12 |
| 6,707,851 B1 | 3/2004 | Choi et al. | |
| 7,453,939 B2 | 11/2008 | Pan et al. | |
| 8,175,379 B2 | 5/2012 | Wang et al. | |
| 2007/0133880 A1* | 6/2007 | Sun | G06K 9/38 382/195 |
| 2007/0252831 A1* | 11/2007 | Lind | G06T 11/60 345/419 |
| 2009/0219379 A1* | 9/2009 | Rossato | H04N 5/272 348/14.01 |
| 2009/0245571 A1 | 10/2009 | Chien et al. | |
| 2010/0037273 A1* | 2/2010 | Dressel | H04N 21/4223 725/105 |
| 2010/0328471 A1* | 12/2010 | Boland | G02B 13/004 348/207.99 |
| 2012/0218427 A1* | 8/2012 | Wu | H04N 5/23254 348/208.6 |

\* cited by examiner

*Primary Examiner* — Michael E Teitelbaum
(74) *Attorney, Agent, or Firm* — Procopio, Cory, Hargreaves & Savitch LLP; Mark W. Catanese

(57) ABSTRACT

Systems and methods for extracting objects from a first video and inserting said objects into a second new background. In an embodiment, at least one hardware processor is used to receive a first video depicting a first scene comprising one or more objects and a background; identify the one or more objects in the first video; generating a first video layer by extracting the identified one or more objects from the background of the first video; receive a second video layer depicting a second scene; and merge the first video layer and second video layer to generate a composite scene, wherein the one or more objects of the first video layer overlaid on the second scene such that the one or more objects appear as part of the second scene.

16 Claims, 10 Drawing Sheets

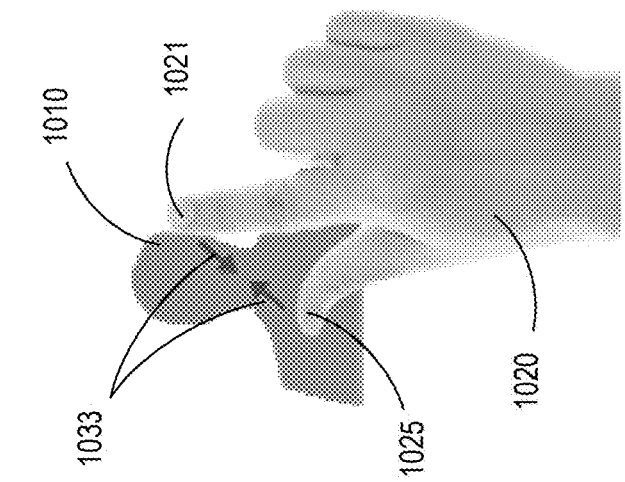
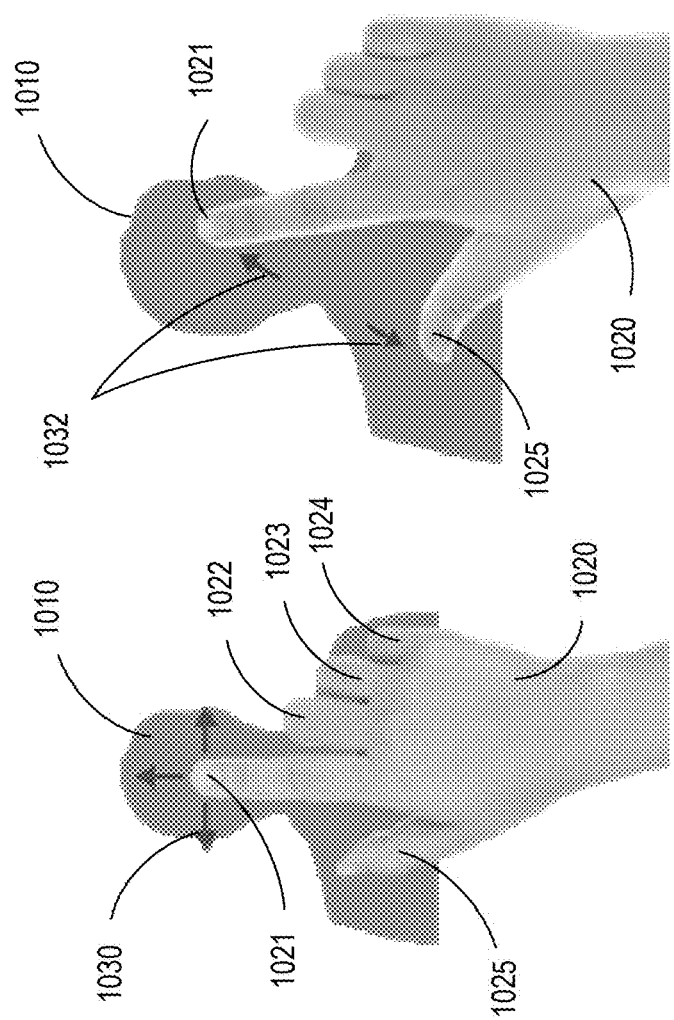
FIG. 10A   FIG. 10B   FIG. 10C

SYSTEMS AND METHODS FOR VIDEO EXTRACTION AND INSERTION

CROSS-REFERENCE TO RELATED APPLICATIONS

This application claims priority to U.S. Provisional Patent App. No. 62/491,389, filed on Apr. 28, 2017, and titled "VIDEO EXTRACTION AND INSERTION TECHNOLOGY," the entirety of which is hereby incorporated herein by reference.

BACKGROUND

Field of the Invention

The embodiments described herein are generally directed to digital video content, and, more particularly, to extracting objects from a first video and inserting said objects into a new background.

Description of the Related Art

Inserting an object from one video into a new background is often complex. Some conventional systems use chomra keying composite techniques to layer two images or video streams together. These systems relay on a color keyed background so to identify an object, such as a person, and insert that object into a new background. However, these techniques are limited to production studios or pre-set locations that have the necessary background, tripods, lighting fixtures, and video editing software to generate a composite video. Thus, these techniques are not optimal for use in generating composite videos from images captured using mobile devices or otherwise lack the color keyed backgrounds.

Also, systems exist that allow video data to be processed and output for display. Video data includes large amounts of data to meet the demands of consumers and video providers, such as video of the utmost quality, with high fidelity, resolutions, frame rates, and the like. As a result, the large amount of video data that is required to meet these demands places a burden on devices that process, edit, and store the video content.

Thus, there is a need for systems capable of generating composite videos from high resolution video captured by any device with any background, without the reliance on production studios and adversely impacting these systems use of processing and power resources.

SUMMARY

Systems and methods for extracting objects from a first video and inserting said objects into a second new background are disclosed herein.

According to one aspect, a method is disclosed. The method comprises using at least one hardware processor to: receive a first video depicting a first scene comprising one or more objects and a background; identify the one or more objects in the first video; generating a first video layer by extracting the identified one or more objects from the background of the first video; receive a second video layer depicting a second scene; and merge the first video layer and second video layer to generate a composite scene, wherein the one or more objects of the first video layer overlaid on the second scene such that the one or more objects appear as part of the second scene.

In another aspect, a mobile device is disclosed. The mobile device comprises at least one hardware processor; and one or more software modules that, when executed by the at least one hardware processor, receive a first video depicting a first scene comprising one or more objects and a background; identify the one or more objects in the first video; generating a first video layer by extracting the identified one or more objects from the background of the first video; receive a second video layer depicting a second scene; and merge the first video layer and second video layer to generate a composite scene, wherein the one or more objects of the first video layer overlaid on the second scene such that the one or more objects appear as part of the second scene.

In another aspect, a non-transitory computer-readable medium is disclosed having instructions stored therein is disclosed. The instructions, when executed by a processor, cause the processor to: receive a first video depicting a first scene comprising one or more objects and a background; identify the one or more objects in the first video; generating a first video layer by extracting the identified one or more objects from the background of the first video; receive a second video layer depicting a second scene; and merge the first video layer and second video layer to generate a composite scene, wherein the one or more objects of the first video layer overlaid on the second scene such that the one or more objects appear as part of the second scene.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 10A-10C illustrate example user interface gestures for modifying an extracted object overlaid on another scene, according to an embodiment.

DETAILED DESCRIPTION

In an embodiment, systems, methods, and non-transitory computer-readable media are disclosed for identifying and extracting objects from a scene. Embodiments, systems, methods, and non-transitory computer-readable media are also disclosed for inserting, merging, and/or otherwise combining extracted objects from a first scene with a second scene. For example, various embodiments described herein, provide for extracting one or more objects from a first scene that is either acquired using an image acquisition device (e.g., a camera or the like) or stored in a database. The first scene may be a video scene or a still picture. The extracted objects can then be inserted into a second scene (e.g., a video and/or photograph) to produce a third composite scene (sometimes referred to as a "third scene;" "composite scene" and/or "third composite scene") comprising the extracted objects as part of the second scene. In some embodiments, insertion may be achieved by overlaying a modified first scene including the extracted objects onto the second scene. The various embodiments described herein are able to identify and extract the objects in a first scene, modify the first scene, and merge the first and second to generate a composite scene using low processing requirements that permit for increased speed with minimal usage of resource. Such advantages provide for an ability to carry out the methods described herein on a single device (e.g., a mobile device) in a matter of seconds. However, it will be understood that the methods and systems described herein are not limited to performance on a mobile device.

As used herein "a scene" may refer to an instance of any type of image content. For example, a scene may refer to a single still photograph depicting one or more objects or subjects, background, and foreground. In another embodiment, a scene may refer to a collection of related images or frames that form a video comprising one or more objects, background, and foreground. A scene may be distinguishable from another based on, for example, different backgrounds, different object(s), or the like.

After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
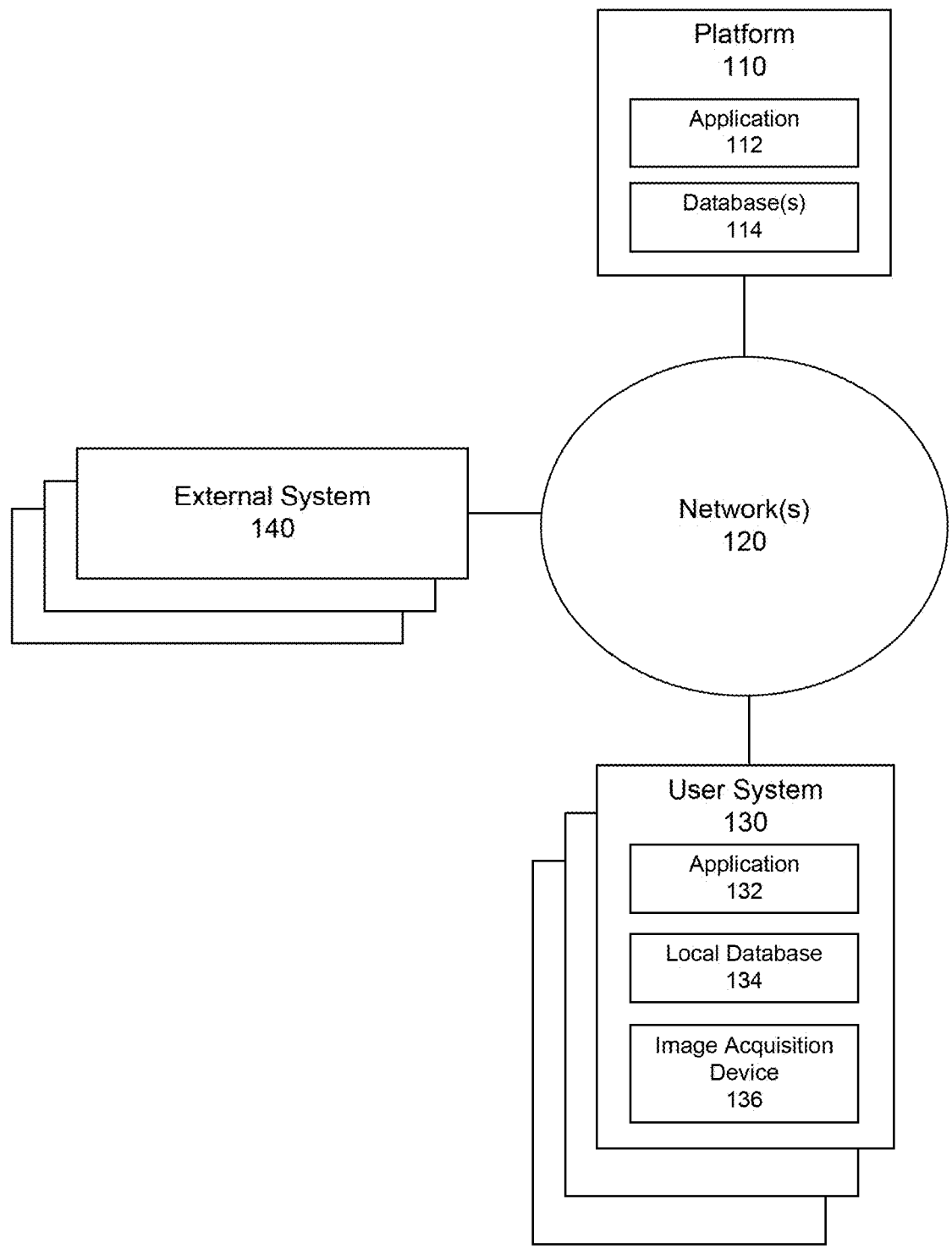
FIG. 1 illustrates an example infrastructure, in which one or more of the processes described herein, may be implemented, according to an embodiment.

FIG. 1 illustrates an example infrastructure in which the disclosed system may operate, according to an embodiment. The infrastructure may comprise a server 110 (e.g., one or more servers) which hosts and/or executes one or more of the various functions, processes, and/or methods described herein. Server 110 may comprise dedicated servers, or may instead comprise cloud instances, which utilize shared resources of one or more servers. These servers or cloud instances may be collocated and/or geographically distributed. Server 110 may also comprise or be communicatively connected to a server application 112 and/or one or more databases 114. In addition, server 110 may be communicatively connected to one or more user systems 130 via one or more networks 120. Server 110 may also be communicatively connected to one or more external systems 140 (e.g., websites, apps, other servers, etc.) via one or more networks 120.

Network(s) 120 may comprise the Internet, and server 110 may communicate with user system(s) 130 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. While server 110 is illustrated as being connected to various systems through a single set of network(s) 120, it should be understood that server 110 may be connected to the various systems via different sets of one or more networks. For example, server 110 may be connected to a subset of user systems 130 and/or external systems 140 via the Internet, but may be connected to one or more other user systems 130 and/or external systems 140 via an intranet. Furthermore, while only a few user systems 130 and external systems 140, one server application 112, and one set of database(s) 114 are illustrated, it should be understood that the infrastructure may comprise any number of user systems, server applications, and databases.

User system(s) 130 may comprise any type or types of computing devices capable of wired and/or wireless communication, including without limitation, desktop computers, laptop computers, tablet computers, smart phones or other mobile phones, wearable mobile devices, servers, game consoles, televisions, set-top boxes, electronic kiosks, and the like. Such user system(s) 130 may comprise image acquisition device 136, such as a camera, scanner, and the like, which are cable to acquire images including photographs and/or video.

Server 110 may comprise web servers which host one or more websites and/or web services. In embodiments in which a website is provided, the website may comprise one or more user interfaces, including, for example, webpages generated in HyperText Markup Language (HTML) or other language. Server 110 transmits or serves these user interfaces in response to requests from user system(s) 130. In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to server 110 and the responses from server 110, including the user interfaces, may both be communicated through network(s) 120, which may include the Internet, using standard communication protocols (e.g., HTTP, HTTPS). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114) that are locally and/or remotely accessible to server 110. Server 110 may also respond to other requests from user system(s) 130.

Server 110 may further comprise, be communicatively coupled with, or otherwise have access to one or more database(s) 114. For example, server 110 may comprise one or more database servers which manage one or more databases 114. A user system 130 or server application 112 executing on server 110 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Sybase™, Access™, and the like, including cloud-based database instances and proprietary databases. Data may be sent to server 110, for instance, using the well-known POST request supported by HTTP, via FTP, etc. This data, as well as other requests, may be handled, for example, by server-side web technology, such as a servlet or other software module (e.g., application 112), executed by server 110.

In embodiments in which a web service is provided, server 110 may receive requests from external system(s) 140, and provide responses in eXtensible Markup Language (XML) and/or any other suitable or desired format. In such embodiments, server 110 may provide an application programming interface (API) which defines the manner in which user system(s) 130 and/or external system(s) 140 may interact with the web service. Thus, user system(s) 130 and/or external system(s) 140 (which may themselves be servers), can define their own user interfaces, and rely on the web service to implement or otherwise provide the backend processes, methods, functionality, storage, etc., described herein. For example, in such an embodiment, a client application 132 executing on one or more user system(s) 130 may interact with a server application 112 executing on server 110 to execute one or more or a portion of one or more of the various functions, processes, methods, and/or software modules described herein. Client application 132 may be "thin," in which case processing is primarily carried out server-side by server application 112 on server 110. A basic example of a thin client application is a browser application, which simply requests, receives, and renders webpages at user system(s) 130, while the server application on server 110 is responsible for generating the webpages and managing database functions. Alternatively, the client application may be "thick," in which case processing is primarily carried out client-side by user system(s) 130. It should be understood that client application 132 may perform an amount of processing, relative to server application 112 on server 110, at any point along this spectrum between "thin" and "thick," depending on the design goals of the particular implementation. In any case, the application described herein, which may wholly reside on either server 110 (e.g., in which case application 112 performs all processing) or user system(s) 130 (e.g., in which case application 132 performs all processing) or be distributed between server 110 and user system(s) 130 (e.g., in which case server application 112 and client application 132 both perform processing), can comprise one or more executable software modules that implement one or more of the processes, methods, or functions of the application(s) described herein.

1.2. Example Processing Device

Figure 2:
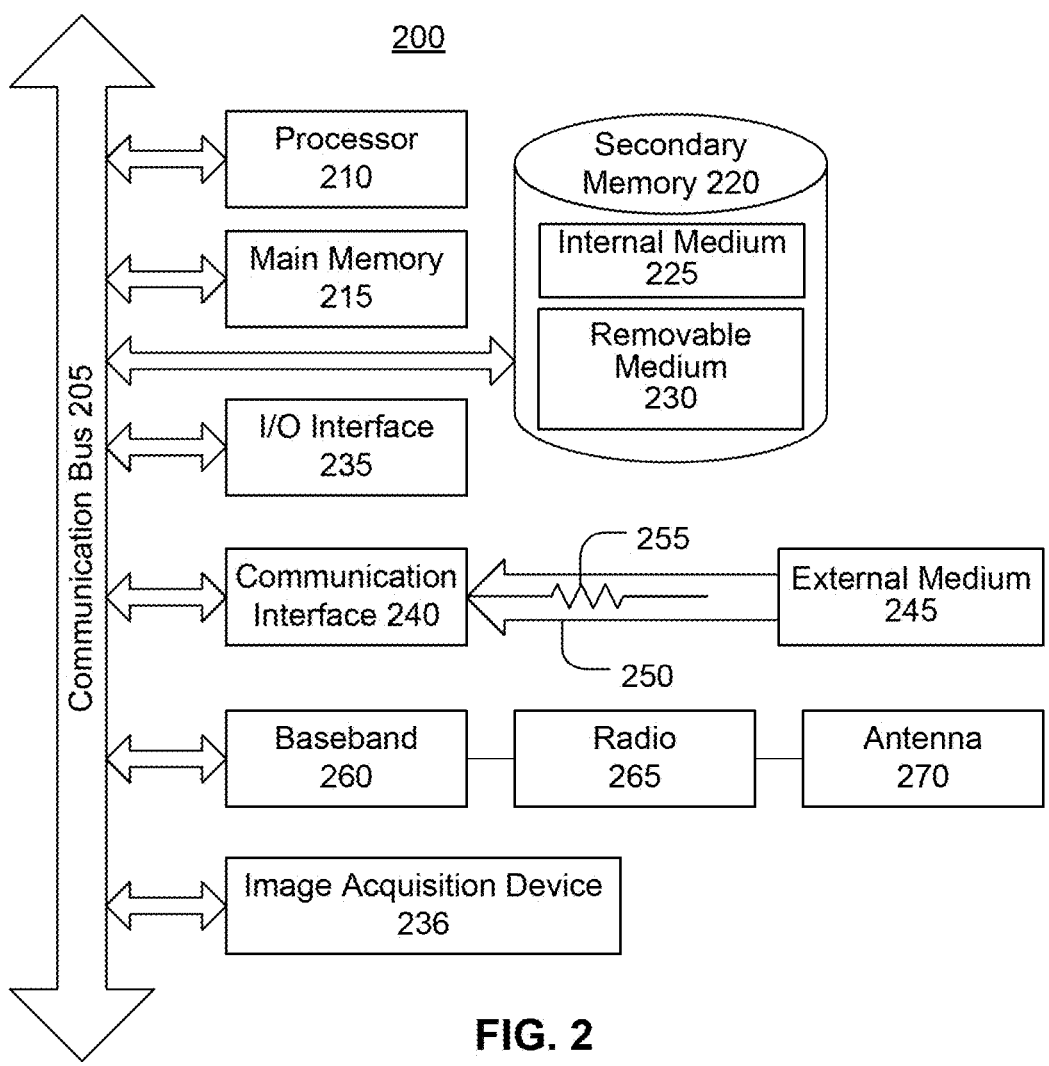
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example, system 200 may be used as or in conjunction with one or more of the mechanisms, processes, methods, or functions (e.g., to store and/or execute the application or one or more software modules of the application) described herein, and may represent components of server 110, user system(s) 130, external system(s) 140, and/or other processing devices described herein. System 200 can be a server or any conventional personal computer, mobile device, wearable device, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, etc.

Removable storage medium 230 is a non-transitory computer-readable medium having stored thereon computer-executable code (e.g., disclosed software modules) and/or data. The computer software or data stored on removable storage medium 230 is read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, etc. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also codes the digital signals for transmission and generates a baseband transmit audio signal that is routed to the modulator portion of radio system 265. The modulator mixes the baseband transmit audio signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

In various embodiments, system 200 includes an image acquisition device 236 coupled to the communication bus 205. The image acquisition device 236 may be configured to acquire images including photographs and/or video. A video may be a plurality of still images (e.g., frames) that are sequentially displayed so to be viewable as a video. In some embodiments, the image acquisition device 136 may be a camera system including a lens assembly that directs light from the surrounds onto an image sensor that generates an image. The image sensor may be any one of a CMOS sensor array, CCD sensor, or the like. The image sensor may be communicatively connected to the communication bus 205 for transmitting the image to the various components of the system 200. For example, the image may be stored in the main memory 215 and/or second memory 220, communicated over any of the communication interfaces, processed by the processor 210, etc.

2. Process Overview

Embodiments of the systems, devices, and methods disclosed herein will now be described in detail. It should be understood that the described processes may be embodied in one or more software modules that are executed by one or more hardware processors, e.g., as the application discussed herein (e.g., server application 112, client application 132, and/or a distributed application comprising both server application 112 and client application 132), which may be executed wholly by processor(s) of server 110, wholly by processor(s) of user system(s) 130, or may be distributed across server 110 and user system(s) 130 such that some portions or modules of the application are executed by server 110 and other portions or modules of the application are executed by user system(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Systems and methods described herein provide for identifying and extracting objects from a first scene and, in some embodiments, for inserting, merging, and/or otherwise combining the extracted object(s) with a second scene to produce a third composite scene. For example, the process for producing the third scene is schematically illustrated with the aid of screen shots shown in FIG. 3 and the process of FIG. 4.

Figure 3:
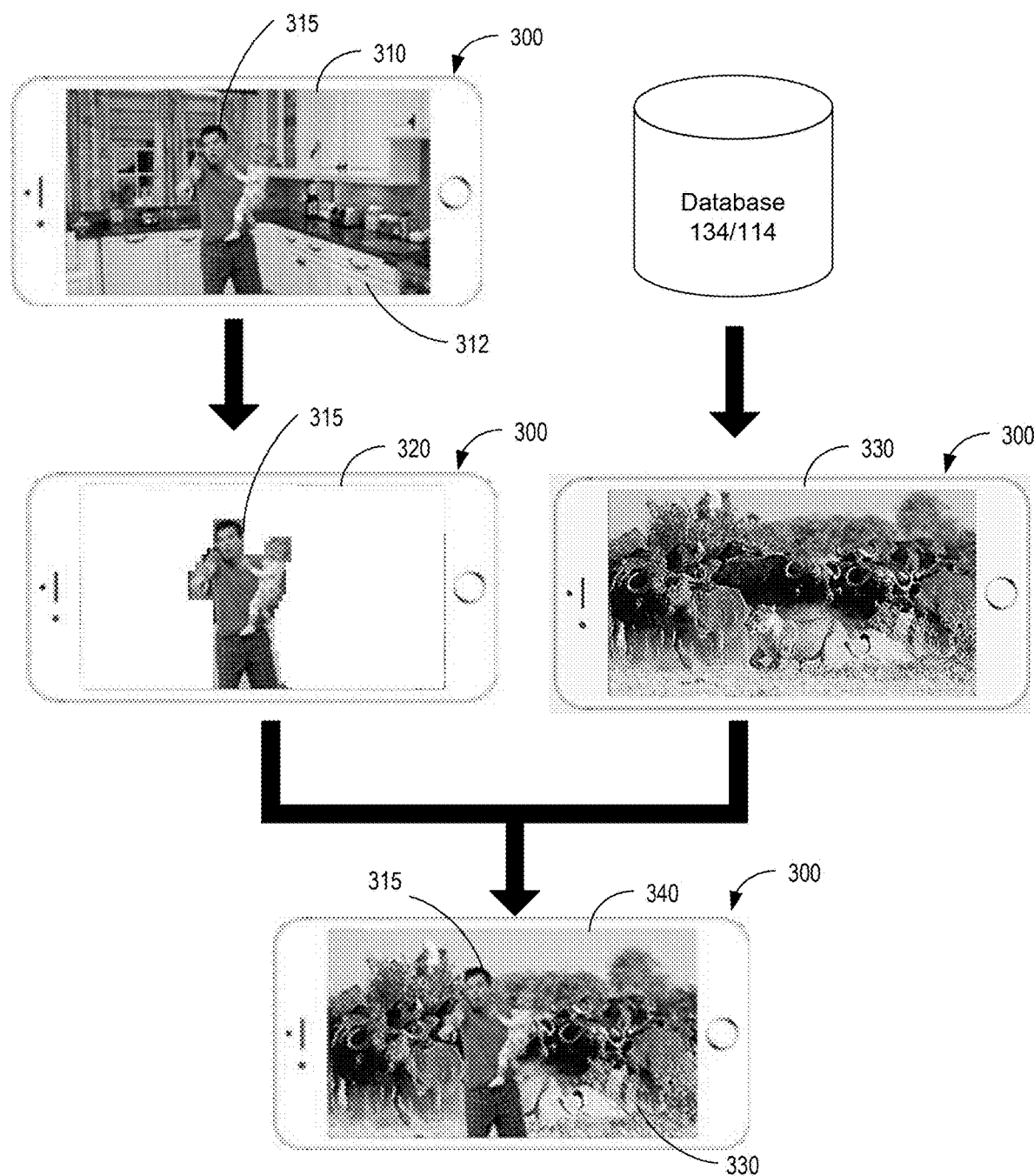
FIG. 3 illustrates screen shots schematically illustrating an example process for generating a composite video, according to an embodiment.

As illustrated in FIG. 3, a first scene 310 is displayed on a user system 300. The user system 300 may be substantially similar to user system 130 of FIG. 1 and/or system 200 of FIG. 2. The first scene may be, for example, acquired by an image acquisition device 136 and/or 236 or otherwise stored in a database of user system 300 or an external database. The first scene 310 may include an object 315 and background 312. In this example, the object 315 is a plurality of objects including a person and a baby, while the background 312 is a kitchen environment. The first scene may be a photograph or a video where objects 315 are moving, the background is moving, the image acquisition device is moving relative to the first scene 315, or any combination thereof.

Embodiments described herein identify the objects 315 and extract the objects 315 from the background 312. In some embodiments, extracting objects 315 comprises modifying the scene 310. For example, scene 320 illustrates a modified first scene 310, where the objects 315 have been identified and the background 312 has been made transparent (e.g., data of the associated with the background scene has been modified to be transparent), as will be described below in more detail. In some embodiments, the identification of objects 315 and modification of the first scene 310 permits users of the systems to extract objects 315 without using specific photography or special effects techniques, such as green screens, tripods, special lighting or the like. Furthermore, the processes described herein permit the entire extraction process to be performed locally on the user system 200.

Figure 4:
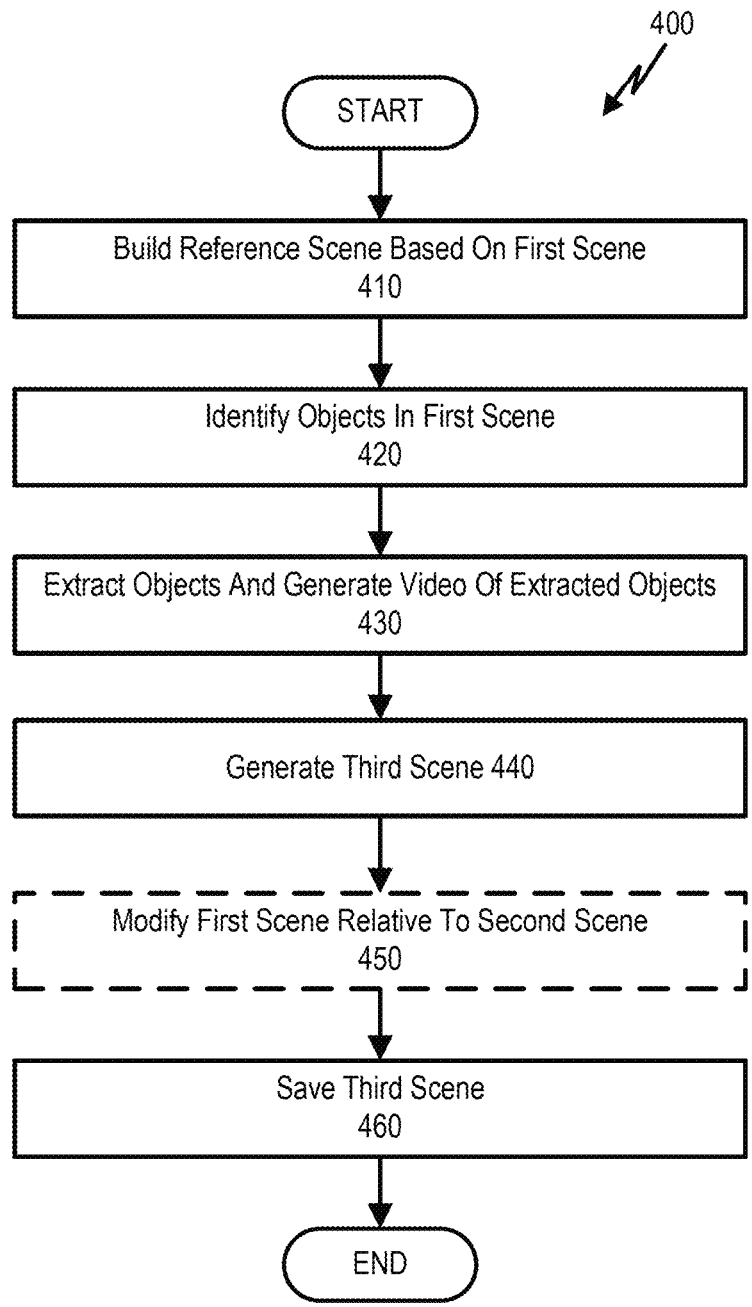
FIG. 4 is an example flow chart illustrating a process for generating a composite video, according to an embodiment.

For example, a process of identifying and extracting objects 315 from the first scene 310 is shown in steps 410 through 430 of FIG. 4. In various embodiments, the first scene (e.g., a source scene) is processed to identify objects to be extracted. To do this, in one embodiment, a step 310 a reference frame is dynamically built. In some embodiments, the reference frame is built dynamically over a plurality of frames of the first scene. In an embodiment, the systems described herein process a plurality of frames by comparing content therein to determine what is the background and what are objects, as described below in greater detail. In some embodiments, an object may start as being classified as background of the scene, and based on the processing in step 420 identified as an object. In an example embodiment, objects may be identified based on image processing of each frames to identify and track edges of objects and background features within each frame. As described below in greater detail, the edges identified in a frame are analyzed in relation to the same edge in previous and/or subsequent frames to evaluate whether the edge is an edge of an object or an edge of a background feature.

In some embodiments, alone or in combination, step 420 may include accounting for movement of the image acquisition device used to acquire the scene. For example, without the use of a tripod, a scene may move or shake. The systems described herein are configured to determine the movement and compensate for all forms of such movement. For example, but not limited to, translation, tilt, and rotation. Compensating for the movement may include stabilizing the first scene, as will be described below in greater detail.

At step 430, the identified objects may be extracted from the first scene. For example, extracting the objects permits the systems to classify the identified objects as not part of the background. Once the objects are extracted, the process 400 generates a modified or processed first scene. For example, the systems described herein may edit the data content of each frame of the first scene to extract the objects. In one embodiment, background or all non-extracted objects of each frame of the first scene are made to be transparent, as described below, and the modified frames are used to build the modified first scene frame by frame.

Returning to FIG. 3, a second scene 330 is illustrated that is a different scene than the first scene 315. In this example, the second scene is a stampede of bison. However, it will be appreciated that scene 330 may be any scene and may also be the same scene as scene 310. FIG. 3 illustrates second scene 330 as retrieved from a database (e.g., a local database 134, server database 114, or any other local or external database). However, the scene 330 may also be acquired by the image acquisition device of the user system.

The extracted object 315 of first scene 310 may be inserted into the second scene 330 to generate a third scene 340 as shown in FIG. 3 and step 440 of FIG. 4. As illustrated, the third scene 340 may therefore include the extracted object(s) 315 overlaid on the second scene 320, such that it appears that the extracted objects 315 are part of the second scene 330. This may be achieved by overlaying the modified first scene 320 including transparent background 312 on the second scene 330, such that the second scene 330 is viewable. The extracted objects 315 may be combined with the second scene 330 as a video, and vice versa, unaltered by the other video. For example, such that the objects 315 still move as in the original video of the scene 310 and the second scene 330 moves as in the original video of the scene 330.

The generated third scene 340 may be displayed to the user on a display of the user system. For example, the extracted objects 315 may be displayed as a layer on top of the displayed second scene 330. As described above, the second scene 330 may be video or a still-image. In some embodiments, the modified first scene 320 may be displayed frame by frame while the second scene 330 is simultaneously displayed frame by frame. As such, the third scene may be separate videos displayed simultaneously on the same display of the user system overlaid on top of each other. This may be referred to herein as "playback" and/or "playback mode."

In some embodiments, generating the third scene 340 includes adjusting the extracted objects 315, for example, such that that the objects are properly orientated and scaled relative to the second scene 330. The extracted objects may be rotated, flipped, increased in size, decreased in size, and the like such that the extracted objects 315 are in a proper orientation. In some embodiments, the adjusting of the objects 315 may be performed by the system described herein, for example, by to account for relative changes between respective source scenes in aspect ratio, resolution, overall size, orientation (e.g., landscape vs. portrait orientation) and/or the like. In some instances such adjusting is done automatically as part of step 440. In another embodiment, adjusting may be performed by the user of the systems described herein. In some embodiments, adjusting the extracted objects 315 may include adjusting the associated transparent background in a similar manner.

In some embodiments, at optional step 450 the systems described herein may permit the user to modify the third scene 340 in real-time during playback of the third scene 340. For example, the extracted objects 315 can be repositioned (e.g., panning left, right, up or down), zoomed (e.g., making the extracted object larger or smaller to scale with the second scene), or rotated (e.g., clockwise or counter-clockwise) through user interactions, as described below in greater detail. Thus, the extracted objects 315 may be scaled and/or positioned appropriately with respect to the second scene 330 while the system displays the third scene 340. In some embodiments, each scene may include an audio file, which can be modified in accordance with the combination of the scenes. For example, the volume of the audio file of the first scene 310 and/or second scene 330 may be adjusted to the user's preferences to produce the third scene. Additionally, audio effects can be applied such as music, sound effects or added voices. In some embodiments, the second scene 330 may also be swapped out for another scene at will and without affecting the extracted objects 315 of the first scene.

At step 460, the third scene 340 may be saved to a database (e.g., local database 134 and/or an external database). For example, the extracted objects 315 (and transparent background) may be combined and saved with the second scene 330. In some embodiments, the various audio layers as described above may also be combined into the third scene 340 and saved for subsequent viewing. In some embodiments, saving the third scene 340 includes combining the modified first scene and second scene frame by frame. The frame size may be scaled, if required, to match the second scene. Any modification of the first scene is accounted for and saved in the third scene. The third scene 340 may be encoded into any video format (e.g., MP4, MPEG-2, MPEG-4, 3GP, WMV, AVI, and the like). Similarly, the audio files may be saved in association with or as part of the video file of the third scene in any encoded format (e.g., MP3, AAC, MPEG-4, and the like).

While description herein is made with reference to first and second scenes that are combined to produce a third scene, it will be understood that embodiments herein are not so limited. For example, similar processes may be executed in tandem or in subsequent processing steps on a plurality of scenes to extract objects from any number of scenes into scenes and combine a plurality of the extracted objects into a single combined scene (as described below). For example, a first scene may include a first object and a second scene may include a second object. Both objects maybe identified and extracted from their corresponding scene and combined along with a third scene to produce a fourth combined scene. The user may select which of the scenes are to be overlaid in which order. Thus, the second object may be overlaid on the third scene, but between the third scene and the first object. In this way, the first object may be "in front of" or otherwise be in the foreground relative to the second object.

2.1. Example Data Structure and Levels of Data Abstraction

In an embodiment, the application 132 provides for efficient image processing by providing data structures that assist to increase the image processing speed. For example, a scene may be stored as a one or more of image frames (sometimes referred to herein as "frames"), for example, a single frame in the case of a still image or a plurality of frames in the case of video. Each frame may be stored as data structure comprising data for rendering the image on a plurality of pixels of a display (e.g., of the user system). Each pixel may be associated with data for rendering a plurality of colors and opacity. For example, data may be provided for rendering certain levels of red, green, and blue along with an alpha value. In some embodiments, the color levels may be represented from 0 to 255, however, other ranges are possible. In some embodiments, the alpha value may be from 0 to 255, where 0 represents transparent and 255 represents opaque. Pixel data may also be represented in other colors, and are not limited to only red, green, and blue pixel data. For high definition images and video, each frame may include pixel data many pixels which increases processing time. For example, a frame rendering high definition video may comprise 1920×1080 pixels, thus the data structure may include R, G, B, and a values for up to 2,073,600 pixels. Other resolutions are possible, for example, 8K, 4K, 2K, etc. resolution. In some embodiments, the scene may be resized prior to processing. Thus, to process every pixel in each frame may result in increased processing time.

Accordingly, embodiments described herein provide for efficient processing by reducing the number of pixels to be processed in each frame. For example, as will be described below, improved processing speeds and reduce resource requirements may be achieved by processing subsets of pixels in a hierarchical data structure. The top level of the data structure comprises larger groupings of pixels, and each level of abstraction includes groupings of fewer pixels.

In various embodiments, a frame may be a first or top level of abstraction and include all pixels of that frame. For example, if the frame is 1920×1080 pixels, the first level of abstraction encompasses all pixels and data associated therewith. In some embodiments, the frame size is reduced during recording of the video, which may be selected to provide a balance with resolution and speed. At a second level, the frame may also comprise a plurality of regions arranged in a two-dimensional array. For example, the frame may be divided into a 16×9 array of regions. In some embodiments, the array of regions may correspond to an aspect ratio of the frame (e.g., 16:9 or the like). At a third level, each region may comprise a plurality of tiles arranged in a two-dimensional array. For example, each region may comprise a 2×2 array of tiles. Thus, in this example, there may be 32×18 tiles in a frame. At a fourth level, each tile may comprise a plurality of boxes arranged in a two-dimensional array. For example, each tile may comprise a 5×5 array of boxes. Thus, in this example, there are 160×90 boxes in the frame. At a fourth level, each box may comprise a plurality of pixel elements or pixels based on the total number of pixels in the frame. For example, in this example each box would comprise 12×12 pixels. The number of pixels may be based on the size of frame. It will be appreciated that "regions" and "boxes" are used herein for illustrative purposes only, and are not intended to be limiting.

The frame may then be processed in a hierarchical order. For example, the frame may be processed by analyzing each region, then tiles, then boxes, and then pixels. For example, as will be described below, in certain embodiments a determination is made that a region is valid or not. If valid, then the boxes of that region may be analyzed. Finally, only pixels of any valid boxes need be analyzed. Thus, only a subset of pixels need be analyzed in contrast to processing each pixel. Thereby, increasing processing speed.

While a specific example has been described, the hierarchical data structure may comprise different arrangements and distributions. More or fewer levels of abstraction may be used. For example, the data structure may comprise a first, second, and third level of abstraction. Furthermore, each array may be any m×n number of regions, boxes, or pixels as desired to achieve the desired processing time.

2.2. Generate a Reference Frame

Figure 5B:
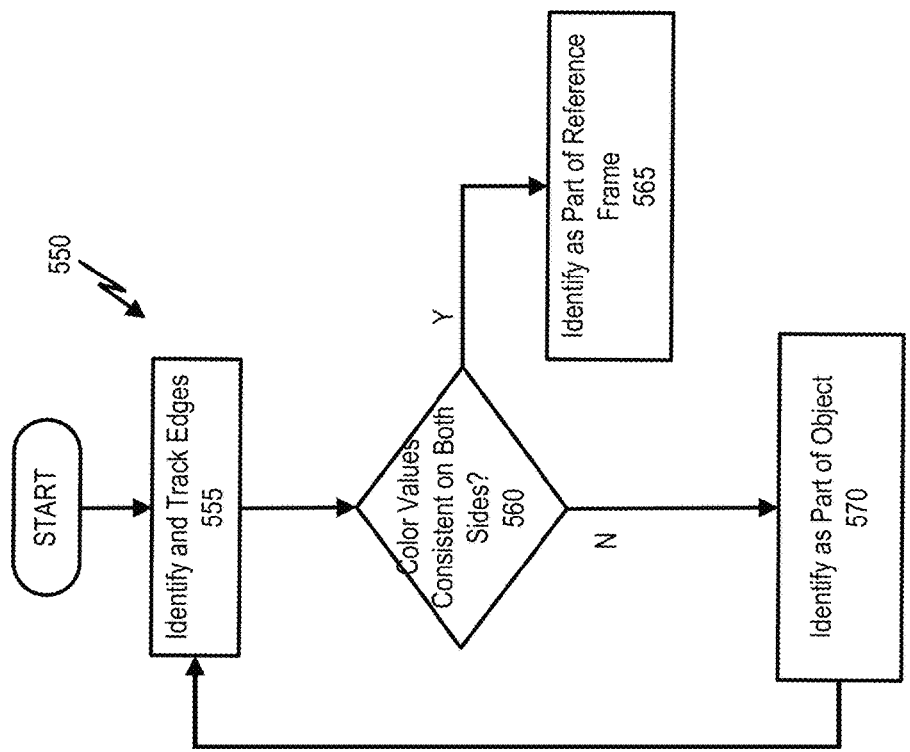
FIGS. 5A and 5B are example flow charts illustrating processes building a reference frame, according to an embodiment.
Figure 5A:
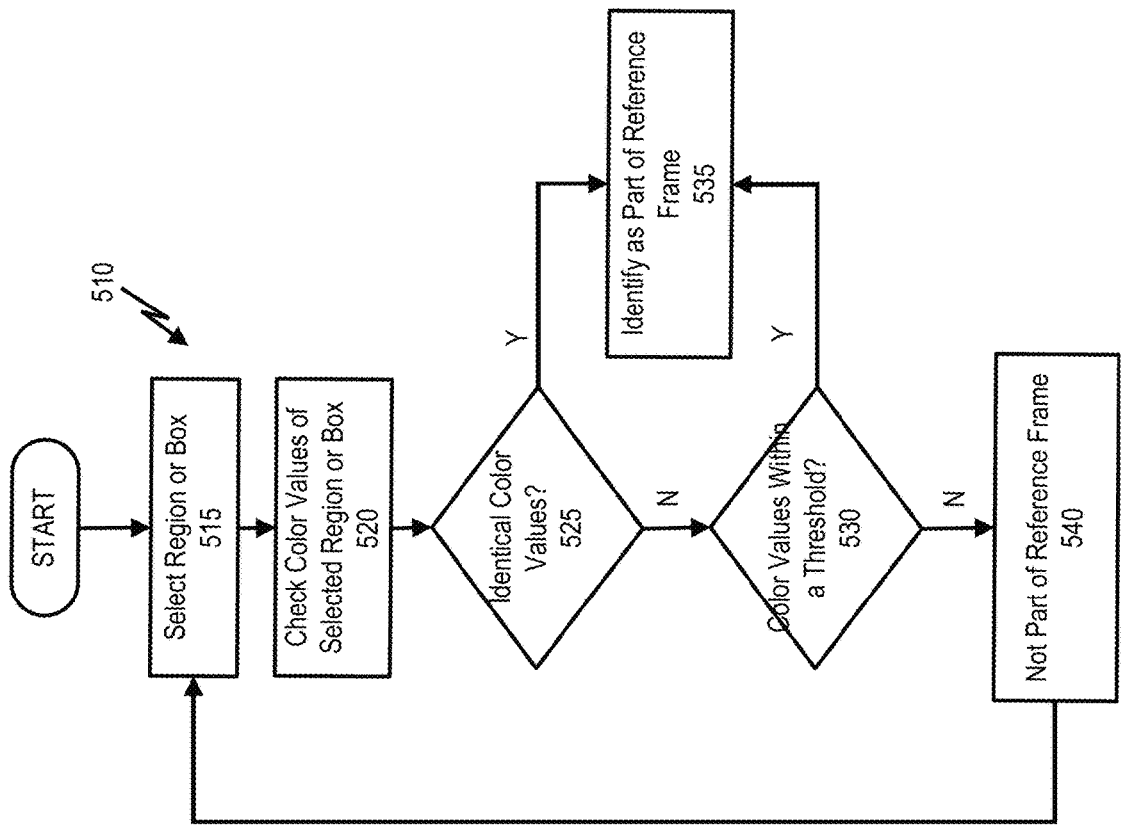

As described above, a reference frame may be used for identifying objects (e.g., objects 315) in a scene (e.g., scene 310). FIGS. 5A and 5B illustrate example embodiments for determining a reference frame, according to an embodiment. While processes 510 and 550 are illustrated with a specific sequence of steps, in alternative embodiments, process may be implemented with more, fewer, or a different arrangement and/or ordering of steps. Processes 510 and 550 may each be performed by the application, and may be implemented in either server application 112 and/or client application 132.

In an embodiment, building a reference frame may be based on, for example, a first scene. The reference frame may be used to identify objects in the scene in accordance with embodiments herein. In some embodiments, the reference frame may be a single image frame representative of background information that can be used as a reference to confirm whether an element included in a video frame is an object. In various embodiments, the reference may be built dynamically over the a few seconds of a source video. For example, where the scene is a video having a refresh rate of 30 frames per second, the application 132 may process the first 60, 90, 120, etc. frames (e.g., two, three, four, etc. seconds of video) to build the reference frame.

FIG. 5A illustrates an example process 510. In some embodiments, process 510 may be performed on every M frames, where M is a predetermined integer of frames of the source scene. However, process 510 may be performed on each frame of the first scene or a first subset of frames (e.g., the first few second of video). For each examined frame, at step 515, a region of the frame or a box of the frame is selected from the plurality of regions and/or boxes. The decision to check either the regions or boxes may be based on which level of abstraction the analysis currently is performed upon, for example, process 500 may be executed on regions in a first instance and then on boxes, as described elsewhere herein.

At step 520, the color values of the pixel data are checked. For example, pixel data of each pixel at the corners of the selected region and/or box in step 515 are compared against each other. In one embodiment, the color values are checked based on color analysis, including but not limited to, the methods described below in Section 2.3. In some embodiments, the pixels are all four corners of the selected box/region are compared. Alternatively, a subset of pixels at the corners (e.g., 2 or 3 pixels) may be compared. Further still, the process need not be performed on the corners, and may be implemented on any subset of pixels within the selected box/region.

At decision step 525, the process determines if the color values of the compared pixels. If yes, then the box/region is identified as part of the reference frame at step 535. If no, then at decision step 530, the process determines if the difference in the pixel values is within a range. In some embodiments, the range may be a threshold. In some embodiments, the range may be based, at least in part, on one or more of Equations 5-14 below described below. If yes, then the box/region is identified as part of the reference frame at step 535. If no, then the box/region is identified as not being part of the reference frame at step 540. In some embodiments, the comparison occurs within each frame. In other embodiments, alone or in combination, the comparison occurs between frames, such that pixel data between frames are compared to determine if that box/region is part of the reference frame.

In some embodiments, the process 500 is performed on each region of the frame to build the reference frame. Any regions identified as a reference frame are saved. The regions that are not identified as a reference frame are further analyzed by, for example, stepping down the hierarchical data structure to the next level of abstraction (e.g., tiles, boxes, etc.) and performing process 510 on each of the next level of abstraction with in each region that is not part of the reference frame.

FIG. 5B illustrates an example process 550. In some embodiments, objects that are to be extracted in subsequent processing steps may start as part of the first frame. The process 550 (and process 510 in some embodiments), may be used to identify background (e.g., reference frame) from objects as described herein. In some embodiments, process 550 may be implemented to discriminate between moving objects and static background areas.

At step 555, the process identifies and tracks one or more edges of the scene. Methods and process for identifying edges is described below in greater detail. In some embodiments, each edge may be associated with corresponding pixel data and color values of the pixels near the edge. For example, pixel data surrounding the identified edge may be associated with the identified edge. For each pixel associated with the edge, the color values of the pixel in a first frame may be compared with the color values of that pixel in a subsequent and/or previous frame. At decision step 560, the process determines whether the pixel data on both sides of the edge is consistent across a plurality of frames. In some embodiments, consistent may be identical or within a threshold range of variation. If yes, then the edge is identified as part of the reference frame (e.g., background) at step 565. If no, and the pixel data is consistent only on one side of the, the edge is identified as part of the object at step 570. In some embodiments, after compensation for video stabilization and shadows as described below in more detail, the content can change on both sides of an edge. In this scenario, the edge may be determined as internal to an object.

An edge can move for various reasons. For example, the edge may be part of a moving object. As the object moves, the edge also moves. Thus, the color on one side of the edge may remain constant while the other side changes. As another example, the edge may be moving because the image acquisition device was moving while acquiring the scene. The image acquisition device movement of translation, tilt and rotation can cause all scene edges to move. Thus, systems and methods described herein also provide for processes to synchronize image acquisition device movement with object movement.

Similar to process 510, process 550 may be performed over a plurality of frames. Furthermore, the process 550 may be performed for each region, and then for each box in a manner similar to that described above in connection to process 510. Thus, the reference frame may be built in an efficient manner.

2.3. Identifying Edges in a Scene

Systems and methods described herein may be configured to identify a plurality of edges in a scene. For example, as described above in connection to FIGS. 3 and 4, edges may be identified, tracked, and analyzed in a first scene for use in determining what is an object as compared to background within the first scene. While the following description is made with reference to the identifying objects in a first scene, it will be appreciated that the process of identifying and analyzing edges is not limited to only this implementation and may be implemented in any scene where edge analysis may be beneficial. Additionally, the processes described herein may be embodied in one or more software modules that are executed by one or more hardware processors, e.g., as the application discussed herein (e.g., server application 112, client application 132, and/or a distributed application comprising both server application 112 and client application 132), which may be executed wholly by processor(s) of server 110, wholly by processor(s) of user system(s) 130, or may be distributed across server 110 and user system(s) 130 such that some portions or modules of the application are executed by server 110 and other portions or modules of the application are executed by user system(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

In various embodiments, one or more edges can be identified by analyzing color data of a plurality for frames that make up the scene. Each frame may be scanned in both horizontal and vertical directions. In some embodiments, the following described process uses whole integers, because floating point numbers may increase processing time and thus reduce efficiency. As such, various examples may be round up or down to the nearest whole integer, may always round down, or may always round up, or any combination thereof as desired for the specific implementation.

As described above, a frame may comprise pixel data that defines red, green and blue values for each pixel. However, other pixel data may be applicable, and are not limited to only red, green, and blue pixel data. In digital form, each color is represented from 0 to 255 when examining a pixel.

In a first method (sometimes referred to herein as "Comparing Color Intensity"), a color intensity of each pixel is calculated and compared with a color intensity of another pixel. For example, the red, green and blue color values may be added as follows:

$$T = R + G + B \qquad \text{Eq. 1}$$

Where T is the simple color intensity for a given pixel, R is the red value of the given pixel, G is the green value of the given pixel, and B is the blue value of a given pixel. For a plurality of pixels, T can be calculated. The T value of two pixels may be compared to determine how far apart the pixels are. For example, by subtracting the T value of a first pixel from the T value of a second pixel, the difference in intensity may be determined. Based on this difference, edges may be identified. For example, if the difference is over a given threshold. In one embodiment, a difference threshold of approximately 80 may be applied to determine an edge, however, any threshold may be used (e.g., 50, 60, 90, 100, etc.) based on the sensitivity desired for any given application. This method is particularly useful in identifying sharp edges having high contrast (e.g., from white to black, high T value to low T value). By comparing a plurality of pixels, an edge may be determined, for example, where neighboring pixels share a similar difference in T value. In some embodiments, this comparison may also be used to determine the polarity of the edge, for example by comparing various pixels in association with relative positions. In some embodiments, the polarity may be determined across a scan, for example, if going from dark to white, the polarity is positive and vice versa.

In a second method (sometimes referred to herein as "Simple Color Distance"), a distance between two pixels is determined based on pixel data of the two pixels to identify an edge. In some embodiments, the color distance may be representative of a distance between two points in a color coordinate space (e.g., RGB color space) and may be a distance in three dimensions.

Method 2: Simple Color Distance

We can calculate the "Simple Color Distance" between two pixels. See equation 2.

For example, a simple color distance (D) between two pixels may be determined as follows:

$$D = \text{abs}(R1-R2) + \text{abs}(G1-G2) + \text{abs}(B1-B2) \qquad \text{Eq. 2}$$

Where R1, G1, and B1 are red, green, and blue pixel values for a first pixel and R2, G2, and B2 are pixel values for a second pixel.

In some embodiments, if the color distance is larger than a threshold, this may be indicative of an edge. Equation 2 may provide a simple distance approximation between pixels that may be far more efficient with processing time as compared to more exact processes. For example, some implementations apply a Pythagorean Theorem, where an equal distance from a point makes a sphere. This approach could produce an octahedron requiring more processing time. Thus, the method described in connection to a more efficient approach.

2.4. Stabilization of a Scene

As described above, an image acquisition device was moving while acquiring a scene that is to be processed in accordance with embodiments described herein. The image acquisition device movement of translation, tilt and rotation can cause scene edges to move, jitter, jumping, or the like. No matter how hard a user attempts to maintain a stabilize image acquisition, without a tripod, the image acquisition device will move and/or shake. Thus, systems and methods described herein also provide for processes to synchronize image acquisition device movement with object movement. In various embodiments, the systems and methods described herein may stabilize the source scene to one-pixel accuracy.

While the following description is made with reference to the extracting an object from a first scene for generating a third scene, it will be appreciated that the process stabilizing the source scene is not limited to this implementation and may be implemented in any scene where stabilization of an acquired scene may be beneficial. Additionally, the processes described herein may be embodied in one or more software modules that are executed locally by one or more hardware processors, e.g., as the application discussed herein (e.g., client application 132), which may be executed wholly by processor(s) of user system(s) 130. In some embodiments, one or more of the processes described herein may executed by processors distributed across server 110 and user system(s) 130 such that some portions or modules of the application are executed by server 110 and other portions or modules of the application are executed by user system(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

In various embodiments, the synchronizing the image acquisition device movement with the object movement includes determining edge offsets to generate a mapping between the reference frame and a given evaluation frame. As used herein, "evaluation frame" refers to any frame that is currently being processed for identification of content therein (e.g., identifying and extracting objects). The evaluation frame includes a plurality of evaluation spaces, which may be a given region, tile, box, or pixel or any level of abstraction as describe above. Similarly, a pervious frame, to which the evaluation frame is compared, may comprise a plurality of reference spaces corresponding to the evaluation space. The evaluation space may be compared against the previous frame to determine an offset between each frame that can be used to get the offset map relative to the reference frame. In one embodiment, the edge offsets are evaluated at the tile level of the hierarchical data structure. Thus as used herein, the evaluation space and/or reference space may refer to a given tile of the evaluation frame and/or previous frame. However, other configurations are possible based on, for example, speed and processing requirements.

In an example implementation, edges of a scene are identified and tracked for a given frame as described above tracking edges. For example, edges are identified in the reference space and, for each given evaluation space, the same or similar edges are also identified for comparing against the edges of the reference space. In certain scenarios, there may be one or more objects in the scene, which may block certain edges. Thus, the system may be unable to track these edges, and the edge offsets are left blank for these evaluation spaces and derived later.

Figure 6:
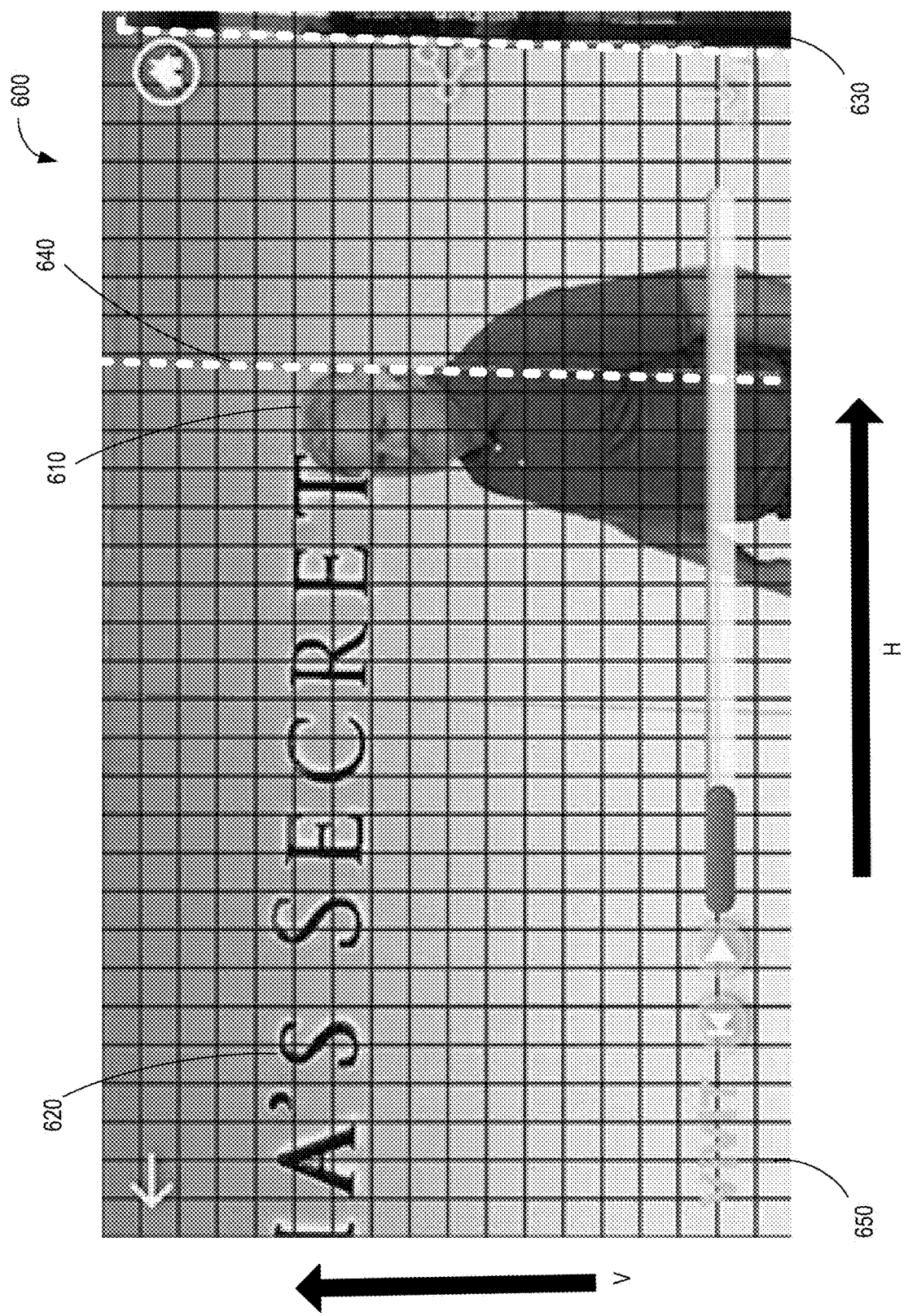
FIG. 6 is an example screen shot illustrating example edge identification and tracking, according to an embodiment.

In one example, edge offsets may be determined using, for example, a one-dimensional scan. Here, the system may scan the highest contrast edge location for each space (e.g., evaluation and reference spaces). For example, FIG. 6 illustrates a scene 600 comprising a plurality of tiles 650 and an objects 610 (e.g., shown as a person 610) to be identified and other background features 620-640 (e.g., a shelf 630, text 620, and a wall 640). The edges of each object are shown in bold lines (e.g., white dotted lines illustrating wall 640 and shelf 630 and white solid lines surrounding text 620), which are referred to herein as "valid edges". The system may be configured to scan across both the horizontal and vertical directions (e.g., from tile to tile horizontally along arrow H and vertically along arrow V). In some embodiments, the one-dimensional scan is performed only on stable edges and not rounded or irregular edges. As illustrated in FIG. 6, only a subset of tiles will contain valid edges. Locations of the valid edges in a current evaluation space are compared with the same tracked edges in a previous reference space to determine an offset value relative to the previous frame. The offset values of each edge from the previous frame may be used to start the scan of the evaluation frame. The reference frame may be a previous frame at the beginning of the scan. When the scan is complete, the offset values for a given evaluation frame are saved and updated for each evaluation space for both horizontal and vertical directions. In some embodiments, there may be some noise and outliers must be discarded. In some embodiments, outliers are discarded based, in part, on neighbor averaging and discard those results that are outside of a threshold limit.

In another example, edge offsets may be determined using, for example, a two-dimensional scan. For example, background scenes may vary widely and do not always contain crisp and stable edges. For example, many scenes contain organic material such as grass, leaves or branches. These edges can get very complex here. In this scenario, the systems described herein may record a two-dimensional pattern within each evaluation space. The two-dimensional pattern may be an irregular shape. The patterns may be scanned in a two-dimensional dither. For example, the pattern may be scanned as a matrix to find the best fit approximation of the irregular edge. Once the best fit approximation of the irregular edge is determined in a first frame, the system may track the edge in subsequent frames and compare evaluation spaces in subsequent frames with reference spaces in previous frames.

Embodiments described herein may use one or both of the above described approaches. The one dimensional scan may be more efficient and quicker than the two-dimensional scan, however, in some scenarios the background may be too complex for use of only the one-dimensional scan. Thus, the system may need to be judicious on how far to employ each approach to reduce time spent on performing stabilization techniques.

In some embodiments, the edge offsets may be calculated for each evaluation space (e.g., tile) based on the comparison of the evaluation space with the reference space. For example, for each evaluation space an offset value may be determined for the pixels comprised in each edge. The offset values from the reference space to the evaluation space for each pixel may be saved as an offset map. In some embodiments, the offset map may be updated dynamically over time by, for example, referred back to the original reference frame. In some embodiments, the offset map may also be determined in the reverse direction, for example, offsets from evaluation to reference.

In some scenarios, only as subset of spaces may be associated with a measured offset as only the subset included an edge. However, in some embodiments, the offset map may require offset values for each evaluation space. For example, some evaluation spaces (e.g., tiles) may include no offset and thus the value may have to be calculated. While others may include noise and be too far out of bounds of a threshold amount of noise. Alternatively, the edge may be behind another object. Thus, in some embodiments, the offset map may be supplemented by smoothing and average calculations.

In some implementations, stabilization using, for example, the above methods may result in an accuracy of a few pixels. In some embodiments greater accuracy may be achieved through box dither. For example, after objects have been extracted, the edges may need to be polished. For example, some of the boxes on the edge of the extracted object may include background content due, for example, to misalignment. Other discrepancies may be possible. These need to be knocked out. To do this, in an example implementation, the system may examine evaluation spaces which correspond to reference spaces that have an edge and perform dithering algorithm on each evaluation space which qualifies. In one embodiment, the dithering algorithm is a two-dimensional dither, but other dithering algorithms are possible. The system identifies the most optimal match relative to the reference space and saves this dither offset. In some embodiments, the dither offset is saved at the box and/or tile levels. However, this dither algorithm may be applied at any level of abstraction, for example, at the region, title, box or pixel levels. This dither offset may be used later when building the edge matte. Without subscribing to any particular scientific theory, the dither offset is believed to bring the stabilization to one-pixel accuracy. By only examining evaluation spaces with edges, processing time may be reduced and efficiency improved.

In some embodiments, the edge matt may be indicative of all pixels disposed outside of identified valid boxes. In an example implementation, pixels are evaluated within adjacent boxes next to or positioned directly adjacent to an edge of a valid box. Pixel decisions may be made one at a time. The edge matt can extend for a couple of boxes within all other valid boxes. Thus, edge matt boxes can extend up to +/−one box from all off-edge adjacent boxes. This method may produce an improved smooth edge while maintaining efficiencies to generate a clean edge.

2.5. Example Frame Analysis

As described above, each frame of a scene is compare against the reference frame, for example, to identify and extract objects. In some embodiments, each frame is examined in a hierarchical order of, for example, regions, tiles, boxes and pixels. While the following description is made with reference to the extracting an object from a first scene for generating a third scene, it will be appreciated that the process for analyzing each frame is not limited to this implementation and may be implemented in any scene where stabilization of an acquired scene may be beneficial. Additionally, the processes described herein may be embodied in one or more software modules that are executed locally by one or more hardware processors, e.g., as the application discussed herein (e.g., client application 132), which may be executed wholly by processor(s) of user system(s) 130. In some embodiments, one or more of the processes described herein may executed by processors distributed across server 110 and user system(s) 130 such that some portions or modules of the application are executed by server 110 and other portions or modules of the application are executed by user system(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Figure 7:
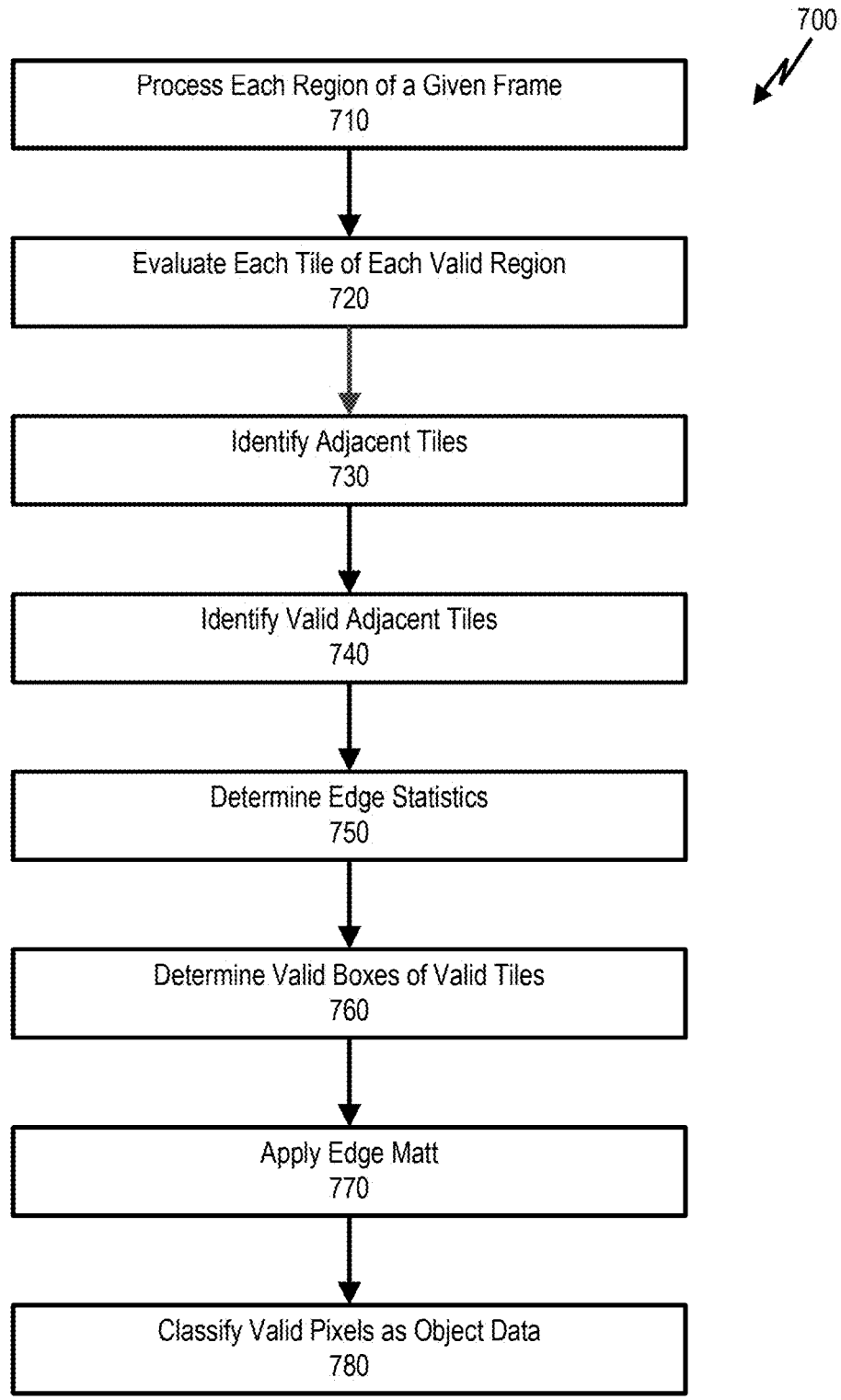
FIG. 7 is an example flow chart illustrating a process for analyzing each frame of a source video, according to an embodiment.

FIG. 7 illustrates an example process for analyzing each frame. For each frame, the process 700 starts at the top of the hierarchical data structure and proceeds downward. Each level may be biased toward background or extracted objects as described herein.

At step 710, each region is processed. In one embodiment, each region is bias to identify pixel data associated with background content. The identified regions may be classified as background for later modification (e.g., making transparent in the pixel data). By using the top level of abstraction biased to remove background content, the majority of the background content may identified in an efficient manner. At step 710, regions that no doubt include some object content may be identified as valid and associated with object data. For example, if any portion of the region includes object content, then the region is valid and kept for further processing. The processing of step 710 may be performed by comparing pixel data of a plurality of pixels within the region. The number of pixels being compared may vary, but should be many pixels to provide a confidence indicator that the region is valid. In some embodiments, a sample matrix of, for example, 9 and/or 12 are used. Other matrices are possible based in part on the desired sensitivity and processing resources. In some embodiments, a plurality of pixels of the processed frame are compared to corresponding pixels from the reference frame. The comparison may be based on, for example, Equation 1 and/or Equation 2 above. For example, in some embodiments, if the color distance is above a threshold, then the region may be considered as including an object. In another embodiment, the comparison may be based on one or more of Equations 5-14 as described below.

At step 720, each tile of each valid region is evaluated. In some embodiments, the process 700 examines a plurality of pixels (e.g., many samples) within each tile. If a number of pixels are identified as containing object data according to the pixel decision algorithm, then the tile is identified as valid. Step 720 is also biased toward identifying background content. Once each tile of the all valid regions has been evaluated, the remaining tiles represent an inner core of tiles which no doubt are associated with the object. The pixel data of included in these tiles may be classified as object data.

However, the inner core of tiles from step 720 may not represent the entire object to be extracted. The process continues to step 730, were the inner core of tiles are expanded to adjacent tiles. At step 740, the adjacent tiles are examined based on the validity of corresponding boxes. For example, the boxes of each adjacent tile may be examined to determine if the box is valid or not. If a box is valid, then the corresponding tile is identified as valid as well. In some embodiments, each box along an edge of a given adjacent tile is examined. In some embodiments, the process may start with an edge of the adjacent tile shared with the inner core tile, as these are more likely to contain object data. Pixel data of the boxes are examined and validity of a given box is determined in a manner similar to the tiles described above. In some embodiments, step 740 may be performed several times, to make sure all valid tiles are identified, such that the system doesn't to miss a hand or foot.

At step 750, edge statistics are collected for each valid tile. For example, edge statistics may include, but are not limited to, identifying edges and determining offsets as described elsewhere. In some embodiments, edges statics are collected prior to proceeding to the next step of process 700.

At step 760, the validity of each box of each valid tile is determined. For example, all valid tiles are processed based, in part, on the edge statistics and color analysis as described herein. Each box of a given valid tile is examined, for example, by sampling pixel data of the pixels included in each box. Similar to the above description, if enough of the sampled pixel data corresponds to the object, the box is valid and identified as the object data.

In some embodiments, some boxes reside within tiles which have edges or structures in the reference space. In this scenario, a dither algorithm (e.g., as determined above in the stabilization process) may be applied to the boxes along the edge of the valid tiles. If there is a close match to the corresponding pixels in the reference frame, then the box is identified as invalid (e.g., corresponding to background data). At this point in process 700, a plurality of boxes are identified as valid which reflect the objects in the scene. At this point, the color values for all pixels within each valid box may be saved as object data (e.g., translated to the temporary storage for merging the second scene) at step 780 and a processed frame starts to appear.

At step 770, pixels along the edges of the object are identified as valid. For example, at step 770, the edge matte (as described above) may be applied. The edge matte comprises the pixels surrounding the valid boxes from step 760. In some embodiments, the edge matte may appear as a layer along the edge of the valid boxes. Each pixel along the edge may be evaluated against the reference frame. Pixels along the inner matte are biased toward association with object. Pixels along the outer matte are biased toward association with the background. This bias may help to reduce a halo ring effect around the object. If a pixel is found to be valid, then the color values are translated to the processed frame at step 780.

For example, an edge matte may be comprised of three types of boxes: level, outer and inner. Level boxes may be the boxes directly adjacent to valid boxes (e.g., off the edge) and every pixel of such boxes may be evaluated. If a valid pixel is found on the outer edge of a level box, then the non-valid box on this edge is evaluated as an outer box. If a non-valid pixel is found on the inner edge of a level box, then this edge may be evaluated as an inner box. For outer boxes, all pixels may be evaluated and the pixel decision may be biased toward being part of the background. For inner boxes, all pixels may be evaluated, and the pixel decision may be biased toward identification of the object.

2.6. Pixel Data Comparison

As described in several embodiments above, pixel data of an evaluation frame or current frame may be analyzed against or compared with corresponding pixels of a reference frame. In some embodiments, the comparison may have to account for discrepancies in the frames. Example discrepancies include, but are not limited to, shadows, reflections, spectral skew and the like. Furthermore, the comparison may account for dark color tones in the pixel data as well.

In some embodiments, the comparison is performed based on, in part, color intensity of the pixels in the reference and evaluation frames. The color intensity of a reference pixel (TR) and an evaluation pixel (TE) may be determined as follows:

$$TR = RR + GR + BR \qquad \text{Eq. 3}$$

$$TE = RE + GE + BE \qquad \text{Eq. 4}$$

Where RR, GR, and BR correspond to red, green, and blue pixel data values of the reference pixel and RE, GR, and BE correspond to red, green, and blue pixel data values of the evaluation pixel.

The intensity ratio (IR) between these two pixels may be determined based on the color intensity as follows:

$$IR = TR/TE \qquad \text{Eq. 5}$$

Once the IR is determined, adjusted color components may be determined based on the IR and the pixel data of the evaluation pixel. For example adjusted color components for red (RA), green (GA), and blue (BA) may be determined as follows:

$$RA = RE * IR \qquad \text{Eq. 6}$$

$$GA = GE * IR \qquad \text{Eq. 7}$$

$$BA = BE * IR \qquad \text{Eq. 8}$$

Based on the adjusted color components, a difference (ADIFF) between the reference pixel data values and the adjusted color components may be determined as follows: We can now calculate the difference between reference and adjusted color values.

$$ADIFF = abs(RR - RA) + abs(GR - GA) + abs(BR - BA) \qquad \text{Eq. 9}$$

In some embodiments, ADIFF may be representative of the difference between the evaluation pixel and the reference pixel. This difference may be used, in part, to determine if a pixel is valid and thus if a corresponding tile or box is valid as described above.

However, in various embodiments, ADIFF may not be enough to may such a determination, for example, due to shadows, reflections, spectral skew, etc. Thus, an expected difference (EDIFF) may be determined. For example, by using edge statistics, the shadows, reflections and spectral skew may be accounted for, as described below. In some embodiments, determining the EDIFF may be based, in part, on an expected intensity ratio of the evaluation pixel data values. The expected intensity ratio of each color component (e.g., REXP, GEXP, and BEXP) may be determined as follows:

$$REXP = RA/IR\text{-}RADJ \qquad \text{Eq. 10}$$

$$GEXP = GA/IR\text{-}GADJ \qquad \text{Eq. 11}$$

$$BEXP = BA/IR\text{-}BADJ \qquad \text{Eq. 12}$$

Where, RA, GA, and BA are determined using Eqs. 6-8; IR is determined using Eq. 5; and RADJ, GADJ, and BADJ are adjusted offsets for each color component. The adjusted offsets of each color component may be derived, in part, based on the edge statistics. For example, ADIFF may need to be adjusted for spectral skew. In this scenario, when collecting edge statistics for each adjacent tile, the IR, RA, GA, and/or BA may be determined and saved. In some embodiments, sample of the adjacent tiles are collected and only samples belonging to the background are saved. From these samples, the IR and adjusted color values may be derived. These can be stored at the box and tile level.

Then the expected color difference (EDIFF) may be determined as follows:

$$EDIFF = \text{abs}(RE\text{-}REXP) + \text{abs}(GE\text{-}GEXP) + \text{abs}(BE\text{-}BEXP) \qquad \text{Eq. 13}$$

The adjusted color difference (ADIFF) and expected color difference (EDIFF) can be used to decide whether an evaluation pixel is valid or not. For example, a pixel value below a threshold limit may correspond to background data. Conversely, a pixel value above the threshold limit may correspond to object data. An example equation is for making this determination is as follows:

$$ADIFF = ALIM\text{-}(OFFSET/ALIM)*EDIFF \qquad \text{Eq. 14}$$

Where, ALIM and OFFSET are constants and can be tuned to bias toward background or object. Example ALIM and OFFSETS may include, but are not limited to 25 and 125, respectively, for a level matte pixel. However, it will be appreciated that any other values may be used to tune the bias of as desired for a given application.

The processes described herein may be embodied in one or more software modules that are executed locally by one or more hardware processors, e.g., as the application discussed herein (e.g., client application 132), which may be executed wholly by processor(s) of user system(s) 130. In some embodiments, one or more of the processes described herein may executed by processors distributed across server 110 and user system(s) 130 such that some portions or modules of the application are executed by server 110 and other portions or modules of the application are executed by user system(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

In various embodiments, an object may comprise pixel data having color values that are close to the color values of the background. For example, even if using a green screen photography technique, if a person wears green clothing the object may be misidentified as background. Thus, for example, a weather person that uses green screen to film their report is instructed not to wear green clothing. Similar close colors may be experienced in the systems and devices described herein. For example, a mobile device may capture any image with numerous colors in the background and on the object. As such, systems and devices herein may experience close colors everywhere and with any color.

Accordingly, embodiments described herein may be configured to adjust the pixel decisions (e.g., determination of validity or not) to account for close colors. In one embodiment, the threshold limits for pixel decisions, for example, by adjusting the constants (e.g., ALIM and/or OFFSET) in Eq. 14. In another embodiment, alone or in combination, the pixel decision constants may be adjusted based on reference intensity ratio (TR). This may be a moving scale. For example, the ALIM and OFFSET constants can be derived based on reference intensity (TR), and can be scaled downward for lower TR. This may help to correct for dark tones in a scene. For example, if the threshold limits are too loose the frame analysis may result in missing parts of the object, for example, seen as holes or tear-outs in the object. However, if the threshold limits are too tight, then the edges may expand and exhibit flak or junk. In some embodiments, edge statistics described below may be applied to polish the edges to a high precision.

In some embodiments, the threshold limits may be adjusted based on the step of the frame analysis. For example, the threshold limits for analysis for the tiles may be different or adjusted relative to the threshold limits of regions and/or boxes, etc.

Even so, in some instances holes may still remain in the object and fragments outside of the object. These may be cleaned or handled separately, for example, by a cleaning algorithm. For example, the fill holes and fragment elimination may work at the box level. Fragment elimination may include examining every valid box; finding all contiguous valid boxes; counting the contiguous boxes; and, if the count is less than a fragment cutoff, then identify these boxes invalid. Filling holes may include, examining every invalid box contained within valid boxes; finding all contiguous invalid boxes; and, if the count is less than a hole cutoff, then identify these boxes valid. The hole cutoff and fragment cutoff may be any desired cutoff, and may be based on considerations of efficiency, processing resources, and accuracy in determinations.

2.7. Shadows and Reflections

Embodiments of the systems and devices described herein are configured to account for shadows and reflections in a scene. As such, embodiments herein are able to extract the object independent of and without extracting the shadows and/or reflections.

As described above, an object in the scene may include shadows and reflections. A shadow may occur when the object blocks a light source. The shadow may be depicted on the background as a gray area resembling the object. A shadow may reduce the color intensity of pixels associated therewith. A reflection may occur when a light source bounces off an object and collects on the background. A reflection may boost the color intensity of the pixels associated therewith. In some instances, the shadows and reflections may be moving within the scene together or independent with each other and relative to either the object and/or background. Furthermore, the shadows and reflections may be moving as fast as the object.

In addition, a shadow or reflection may comprise spectral skew. For example, a light source that illuminates the scene may run warm (red) or cool (blue). If the object blocks a warm light source, the shadow may exhibit a cool spectral skew. Similarly, if the object blocks a cool light source, the shadow may exhibit a warm spectral skew. In the case of reflections, a warm light source may reflect off the object and exhibit a warm spectral skew, whereas a cool light source may exhibit a cool spectral skew. The spectral skew may be occurring dynamically and with fast motion. In general, the darker the shadow, the larger the skew. As the object gets closer to the image acquisition device, the shadow my become darker and skew more severe. Reflections tend to have smaller skew.

To account for shadows, reflections, and spectral skew, systems and methods herein are configured to confirm that the shadows, reflections or skew are part of the background scene. In some embodiments, to account for spectral skew, a skew offset may be determined for each tile, the skew offset may then be applied to each corresponding tile around the edge and throughout the object body to correct the color by removing and/or reducing the spectral skew. For example, the pixel data of the frame may be adjusted based on one or more shadows and/or reflections around the object. In some embodiments, the area around each object may be examined based on taking a plurality of samples therefrom, as described above in connection to FIG. 7. In some embodiments, valid tiles may operate as a starting point and is performed on every frame.

Figure 8:
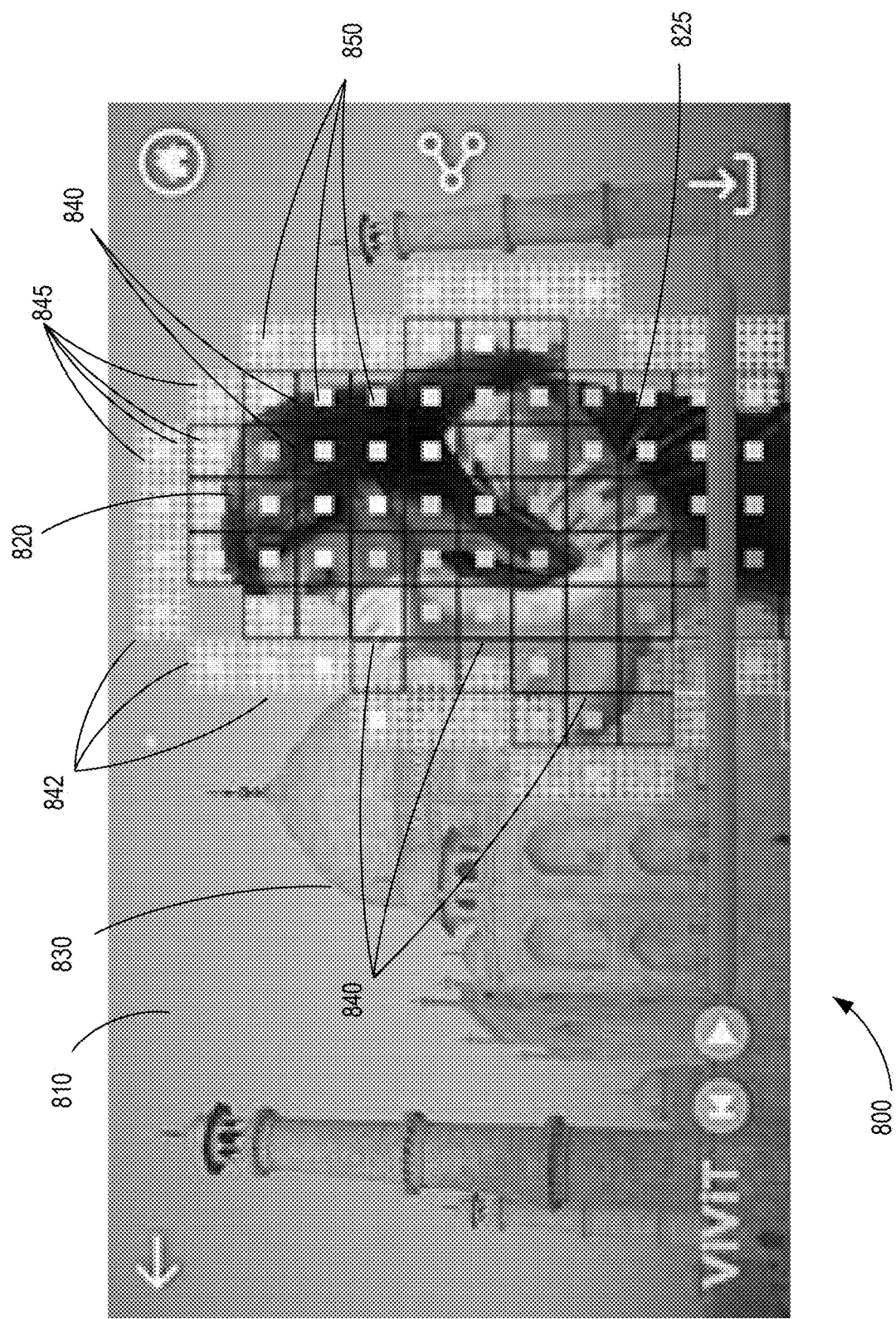
FIG. 8 is an example screen shot illustrating a process for accounting for shadows, reflections, and spectral skew, according to an embodiment.

FIG. 8 illustrates an example screen shot 800 of determining a plurality of spectral offsets, in accordance with an embodiment. FIG. 8 illustrates a scene 810 including a person 820 and a building 830. The screen shot 800 also includes a plurality of tiles 840 and adjacent tiles 842 (e.g., as described above in connection to FIG. 7), some of which comprise a plurality of boxes 845. Additionally, each tile comprises a corresponding square 850 which is indicative of the average IR of the corresponding tile. Furthermore, FIG. 8 illustrates a plurality of samples as boxes 845 that each correspond to their own IR. FIG. 8 may also illustrate the valid tile and adjacent tiles as described in connection to FIG. 7.

In the example scene 810, the person 820 is exhibiting a shadow 825 beneath the arm and lower body. This shadow is for illustrative purposes only, and other shadows and/or reflections may be included in the scene. To account for shadow 825, the IR and spectral skew around the body of person 820 is calculated and stored (e.g., in a database). For example, the system may identify tiles and boxes at the edges of the person 825 and sample pixel data in these tiles and/or boxes to determine the spectral skew and IR. In some embodiments, spectral skew may be determined based on, for example, collecting edge statistics in a manner similar to that described above in connection to Equations 10-12. In some embodiments, the IR and spectral skew information is stored at the tile level and/or box level. By storing the IR information at the box level, the system may achieve a high level of precision without adversely affecting processing time. Other levels of abstraction are possible as well. The IR information and spectral skew may be representative of edge statistics. In some embodiments, the edge statistics can be extrapolated into the object body, for example, by using intelligent averaging. In some embodiments, edge statistics may need to be collected before the frame can be processed in full as described above, because, for example, shadows and reflections can change drastically from frame to frame. In some embodiments, the edge statistics may be used in determining the EDIFF of Equations 10-13.

2.8. Extraction of One or More Objects

In various embodiments described herein, one or more objects may be extracted from a scene. For example, based on the process of FIG. 7, embodiments herein may identify pixel data of a given frame as either corresponding to an object (e.g., object data) or background (e.g., background data) for that given frame. Object data may be representative of all pixel data that corresponds to or otherwise associated with one or more objects to be extracted (e.g., valid regions, tiles, boxes, pixels, etc.). Similarly, background data may be representative of all pixel data that corresponds to or otherwise associated with the background (e.g., invalid regions, tiles, boxes, pixels, etc.). Embodiments herein may then be configured to extract the object from the background.

As described above, each frame comprises a plurality of pixels, that each comprises pixel data represented as red, green, blue, and alpha values. Each value may be set to an integer value from 0 to 255 representative of the color of the pixel. As described above, the alpha value is related to transparency, such that a value of 255 is fully opaque and a value of 0 is fully transparent. Accordingly, each frame of a source scene comprises original data values.

As used herein, extraction may refer to keeping the pixel data unaltered with the original data value. For example, the object data may comprise a plurality of pixels corresponding to pixel data values as identified in step 780 of FIG. 7. Here, the object data may be kept unaltered for a given frame and saved as part of the modified scene (e.g., modified scene 320 of FIG. 3). In some embodiments, the alpha value of the object data may be set to 255 such that appears opaque.

Alternatively, embodiments herein may modify the pixel data of pixels associated with background data. For example, the background data may comprise a plurality of pixels corresponding to pixel data values identified as invalid in process 700. In some embodiments, the alpha values of the background data may be set to 0, thus appearing transparent in each frame of the modified scene.

Figure 9:
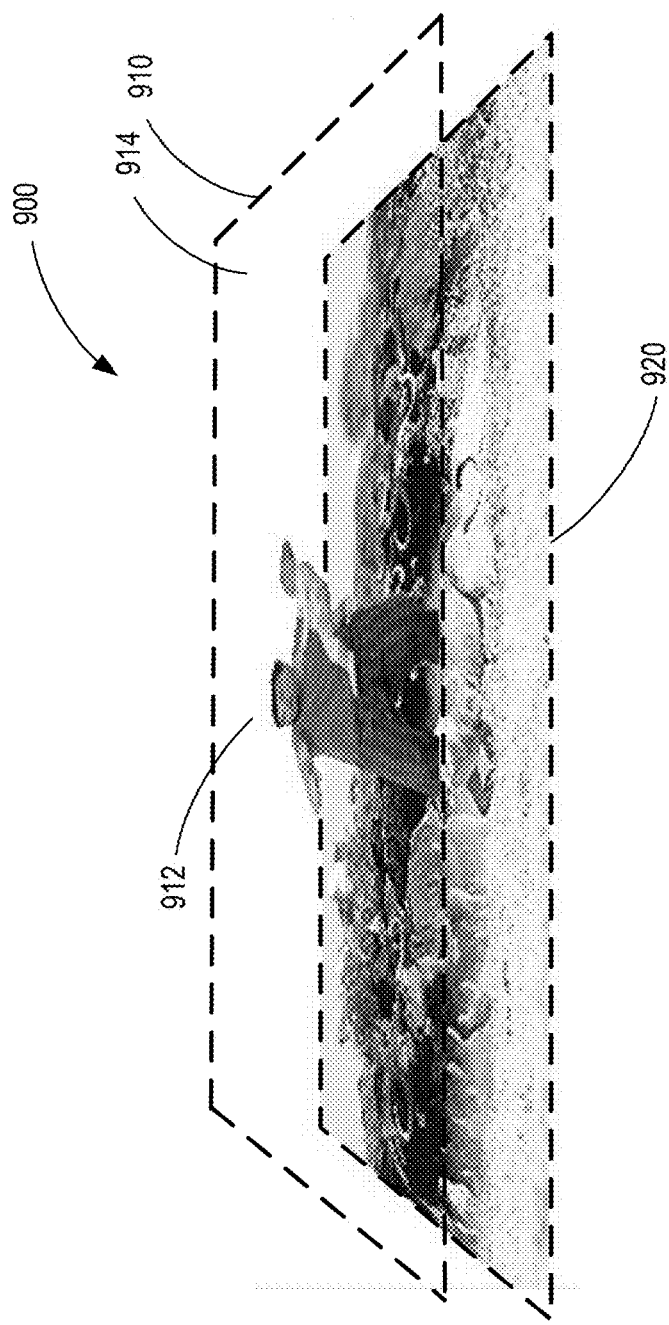
FIG. 9 schematically illustrates a modified video overlaid on another scene, according to an embodiment.

By using transparency, objects can be effectively extracted from the scene. The modified frame may be used to create a new modified scene (e.g., video) with an alpha channel. The modified scene can be placed onto a layer view on top of a new background scene (e.g., second scene 330 of FIG. 3) as shown in FIG. 9. Where pixel data of the top layer is transparent (e.g., alpha value of 0), the background scene layer underneath maybe viewable.

For example, FIG. 9 schematically illustrates overlaid video layers according to embodiments herein. FIG. 9 illustrates a single frame of a third scene 900 (e.g., third scene 340 of FIG. 3.) that comprises a first frame 910 and a second frame 920.

The first frame 910 may be, for example, a modified frame of the modified scene (e.g., modified scene 320 of FIG. 3) comprising object data shown as object 912 (e.g., a father holding a baby) and background data shown as a transparent area 914. While FIG. 9 shows background data as a grayscale frame, this is for illustrative purposes only, and such background data may be transparent as described above. The second frame 920 may be, for example, a frame of a new background scene (e.g., second scene 330 of FIG. 3). The background scene can be either a video or photo. Each video layer has its own view and can act independently. While only two layers are illustrated in FIG. 9, it will be appreciated that more layers may be included. For example, two layers may be included, each comprising object data from a separate scene may be overlaid on the new background.

In some embodiments, the modified scene may be encoded in a video format which supports the alpha channel. Some mobile devices may not provide native support for video with an alpha channel, thus the application 132 may be configured to enable support for alpha channel video.

In some embodiments, an audio file may be associated with each layer 910 and 920. The audio layers may be modified and/or combined as described above in FIG. 3.

Additionally, audio layers for music, sound effects, added voice (e.g., a recording) may be added to the third scene 900. In some embodiments, there may be multiple audio layers included with the third scene. For example, two, three, four, five, etc. audio layers.

In some embodiments, the application 132 may provide a graphic user interface including play, pause and restart functions for controlling the layers in unison. Furthermore, additional function may be provided that allow the user to modify the position, orientation, size, or the like of either layer with respect to the other layer. In some embodiments, playing of the completed third scene will play all layers and audio in sync.

2.9. Interact with Top Video Layer/Interactive Media

Embodiments described herein may also permit the user of the user system to interact with the first scene (e.g., top layer video) relative to the second scene. For example, a graphical user interface may be provided that allows the user to pan, zoom, and rotate to object of the first scene relative to the second scene. For example, the user swipe (or other provide gesture) to instruct the application 132 to adjust the position, size and orientation of the top layer modified scene, as illustrated in FIGS. 10A-10B. This will appear to move the object around the video display. In some embodiments, the extracted object may be interacted with during playback so to interact with the video of a portion of the third scene while leaving the background unaltered due to the user interaction.

For example, FIG. 10A illustrates a figure gesture by the user to reposition (e.g., pan) the extracted object relative to the second scene. FIG. 10A depicts an extracted object 1010 (e.g., a person) and a hand 1020 including fingers 1021-1024 and thumb 1025. Extracted object 1010 may be representative of a single frame of a modified video overlaid on a background scene. As illustrated, the user presses and holds finger 1021 on a portion of the display corresponding to the object 1010. This causes the application 132 to permit the user to pan or drag the object 1010 in any direction shown as arrows 1030. Other configurations are possible, for example, more than one finger, a swiping gesture, etc.

FIGS. 10B and 10C illustrates figure gestured by the user to alter the size of object 1010. For example, the user may use two figures and/or a finger 1021 and thumb 1025 in an outward motion 1032 to cause the object 1010 to zoom in (e.g., increase in size relative to the background). FIG. 10C shows a zoom out function (e.g., decrease in size) via a pinching gesture 1033. In some embodiments, the object 1010 may be rotated based on, for example, placing two or more figures on the object and rotating the figures to cause a corresponding rotation of the object 1010.

In some embodiments, the audio layers may also be modified through the use of user interaction and gestures. These adjustments may be used when the composite (e.g., third scene) is in playback mode (e.g., being displayed). For example, audio corresponding to each video layers can be muted or the volume adjusted. For example, a single figure may be swiped in an upward direction across the display indicating an increase in volume of the first layer, where two fingers indicate an increase in volume of the second layer. Similarly, downward motion may indicate a decrease in volume, and moving the figure to the bottom may indicate muting. A music audio layer may be added to the third scene and its volume adjusted and/or muted (e.g., a third figure). A sound effect audio layer may be added, and its volume level adjusted. Furthermore, a person speaking audio layer may have been added, and its volume level may have been adjusted.

In some embodiments, text can be added to the composite (e.g., third scene) video. For example, text may be included as a title or annotation. The font, size, color, or the like may be adjusted via gesture.

As described above, embodiments herein may include more than one modified video layer (sometimes referred to as "stacked video"). For example, a user may be able to add multiple extracted video layers. For example, the user could add each of their friends into the composite video. Each friend could be singing happy birthday. In some embodiments, this may be performed through a drag and drop operation of each extracted video layer comprising each friend into the composite video via a finger gesture. Such embodiments may also relate to group collaboration, where a plurality of users (e.g., friends, family, co-workers, and the like) can collaborate on the same composite video. For example, multiple users may each generate a modified extracted video layer and add each layer to a single composite video.

In some embodiments, the new background scene and/or one or more extracted video layers can be stored on a database connected on a network (e.g., network 120) and/or in a cloud storage database. Thus, multiple users may be able to share their media with others and/or collaborate on a single stored composite video.

2.14. Saving the Third Scene

Embodiments describe herein provide for saving the layer modified video and new background as a third composite video in a database (e.g., local database 132 and/or an external database). Saving the composite video to the database as described herein may be embodied in one or more software modules that are executed by one or more hardware processors, e.g., as the application discussed herein (e.g., server application 112, client application 132, and/or a distributed application comprising both server application 112 and client application 132), which may be executed wholly by processor(s) of server 110, wholly by processor(s) of user system(s) 130, or may be distributed across server 110 and user system(s) 130 such that some portions or modules of the application are executed by server 110 and other portions or modules of the application are executed by user system(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

For example, at some point the user will be satisfied with the resulting third scene (e.g., scene 340 of FIG. 3). Prior to saving, the third scene is still in multiple composite layers including audio. In one example, the multiple composite layers may be merged frame by frame. For example, if the modified layer is a video and the new background is a photo (e.g., video on photo), then the system may merge each top video frame of the modified video with the photo. This may generate a plurality of frames that includes the modified frames displayed over the photo. Alternatively, if the both layers are video, each frame are synced and merged frame by frame.

In some embodiments, the modified video layer may have been repositioned, zoomed, rotated, or the like. Merging the frames will need to account for these modification settings. The application 132 may adjust the extracted video frame for pan, zoom, and rotation and adjust the frame size so it is the same for both layers. In some embodiments, there may be a minimum frame size permitted so to keep enough resolution for both extracted and background video. In various embodiments, any rotation, zooming, or reposition of either video layer should be performed frame by frame. This may avoid showing an object in an incorrect orientation and avoid blurring of the video.

After merging the layers, the composite video may be encoded, for example, into any video format. This may also help with video compression. Example video formats include, but are not limited to, MP4, MPEG-2, MPEG-4, 3GP, WMV, AVI, and the like. In some embodiments, audio layers may be added to the encoded video, resulting in a single video file containing all audio layers. In some embodiments, the volume of the audio may need to be adjusted and/or normalized. The resulting video may play back exactly as the user viewed in the composite video. In various embodiments, the result video may be smaller in file size. This makes it much more portable and shareable. As such, the user may be able to share the result video with friends through text, email or social media.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method comprising:
   using at least one hardware processor to:
   receive a plurality of image frames of a first video depicting a first scene comprising one or more objects and a background;
   build a reference frame based on at least a subset of image frames of the plurality of image frames of the first video, one or more image frames of the subset of image frames comprising the one or more objects and the background;
   identify the one or more objects in the first video based, in part, on a comparison of the plurality of image frames of the first video against the reference frame;
   adjust the first video using edge identification and tracking to compensate for movement in the first video due to at least one of translational, tilt, and rotational movement in a device used to acquire the first video;
   generate a first video layer by extracting the identified one or more objects from the background of the first video;
   receive a second video layer depicting a second scene; and
   merge the first video layer and second video layer to generate a composite scene, wherein the one or more objects of the first video layer overlaid on the second scene such that the one or more objects appear as part of the second scene,
   wherein each image frame of the plurality of image frames comprises a hierarchical data structure of pixels arranged in a plurality of abstraction levels comprising at least one or more first areas, a plurality of second areas, and a plurality of third areas, the one or more first areas including a first plurality of pixels, each one or more first areas comprising the plurality of second areas including a second plurality of pixels fewer than the first plurality of pixels, and each second area of the plurality of second areas comprising the plurality of third areas including a third plurality of pixels fewer than the second plurality of pixels, and wherein identifying the one or more objects is based, in part, on sequentially analyzing each image frame based on the hierarchical data structure from the one or more first areas to the plurality of third areas.

2. The method of claim 1, wherein the reference frame is representative of the background.

3. The method of claim 1, wherein the one or more objects are identified based on tracking edges of the object.

4. The method of claim 1, wherein the one or more objects are identified based, in part, on analyzing color values of a plurality of pixels of the plurality of image frames of the first video.

5. The method of claim 1,
   wherein sequentially analyzing each image frame comprises, for each of the one or more first areas, using the at least one hardware processor to:
   determine whether at least a portion of the one or more objects is depicted within a respective first area;
   identify the respective first area as comprising the background when the respective first area does not include the at least portion of the one or more objects;
   determine, for each second area of the plurality of second areas of the respective first area, whether one or more of the at least a portion or another portion of the one or more objects is depicted within a respective second area when the at least a portion of the one or more objects is depicted within the respective first area; and
   identify the respective second area as comprising the one or more object when the respective second area does include either of the at least portion or the another portion of the one or more objects.

6. The method of claim 1, wherein adjusting the first video using edge identification and tracking to compensate for movement in the first video due to at least one of translational, tilt, and rotational movement in a device used to acquire the first video comprises:
   determining spatial offsets for each image frame of the plurality of image frames of the first video based on identifying and tracking one or more edges between an image frame and each preceding image frame of the first video, wherein spatial offsets are indicative of movement of the device used to acquire the first video; and
   synchronizing movement in the first video with movement of the device by compensating for the movement of the device based in part on adjusting the first video based the determined offsets.

7. The method of claim 1, wherein each of the plurality of image frames comprises a plurality of pixels each having pixel data comprising a plurality of color data values for rendering colors and an alpha value for rendering opacity, wherein extracting the one or more objects from the background comprises setting the alpha value for each pixel of the background to zero such that the background is modified to be transparent.

8. The method of claim 1, wherein the second video layer comprises at least one of a second video and photograph.

9. The method of claim 1, further comprising using the processor to modify the first video layer relative to the second video layer while the composite video is displayed.

10. The method of claim 9, wherein the modification is performed in response to a user interaction received via a user interface on a device, the interaction comprising, at least, a gesture input.

11. The method of claim 1, wherein the at least one hardware processor is part of a mobile device.

12. A mobile device comprising:
at least one hardware processor; and
one or more software modules that, when executed by the at least one hardware processor,
receive a plurality of image frames of a first video depicting a first scene comprising one or more objects and a background;
build a reference frame based on at least a subset of image frames of the plurality of image frames of the first video, one or more image frames of the subset of image frames comprising the one or more objects and the background;
identify the one or more objects in the first video based, in part, on a comparison of the plurality of image frames of the first video against the reference frame;
adjust the first video using edge identification and tracking to compensate for movement in the first video due to at least one of translational, tilt, and rotational movement in a device used to acquire the first video;
generate a first video layer by extracting the identified one or more objects from the background of the first video;
receive a second video layer depicting a second scene; and
merge the first video layer and second video layer to generate a composite scene, wherein the one or more objects of the first video layer overlaid on the second scene such that the one or more objects appear as part of the second scene,
wherein each image frame of the plurality of image frames comprises a hierarchical data structure of pixels arranged in a plurality of abstraction levels comprising at least one or more first areas, a plurality of second areas, and a plurality of third areas, the one or more first areas including a first plurality of pixels, each one or more first areas comprising the plurality of second areas including a second plurality of pixels fewer than the first plurality of pixels, and each second area of the plurality of second areas comprising the plurality of third areas including a third plurality of pixels fewer than the second plurality of pixels, and wherein identifying the one or more objects is based, in part, on sequentially analyzing each image frame based on the hierarchical data structure from the one or more first areas to the plurality of third areas.

13. The system of claim 12, wherein the one or more objects are identified based on tracking edges of the object.

14. The system of claim 12, wherein t adjusting the first video using edge identification and tracking to compensate for movement in the first video due to at least one of translational, tilt, and rotational movement in a device used to acquire the first video comprises:
determining spatial offsets for each image frame of the plurality of image frames of the first video based on identifying and tracking one or more edges between an image frame and each preceding image frame of the first video, wherein spatial offsets are indicative of movement of the device used to acquire the first video; and
synchronizing movement in the first video with movement of the device by compensating for the movement of the device based in part on adjusting the first video based the determined offsets.

15. The system of claim 12, wherein the one or more software modules further modify the first video layer relative to the second video layer while the composite video is displayed, the modification performed in response to a user interaction received via a user interface on the mobile device.

16. A non-transitory computer-readable medium having instructions stored therein, wherein the instructions, when executed by a processor, cause the processor to:
receive a plurality of image frames of a first video depicting a first scene comprising one or more objects and a background;
build a reference frame based on at least a subset of image frames of the plurality of image frames of the first video, one or more image frames of the subset of image frames comprising the one or more objects and the background;
identify the one or more objects in the first video based, in part, on a comparison of the plurality of image frames of the first video against the reference frame;
adjust the first video using edge identification and tracking to compensate for movement in the first video due to at least one of translational, tilt, and rotational movement in a device used to acquire the first video;
generate a first video layer by extracting the identified one or more objects from the background of the first video;
receive a second video layer depicting a second scene; and
merge the first video layer and second video layer to generate a composite scene, wherein the one or more objects of the first video layer overlaid on the second scene such that the one or more objects appear as part of the second scene,
wherein each image frame of the plurality of image frames comprises a hierarchical data structure of pixels arranged in a plurality of abstraction levels comprising at least one or more first areas, a plurality of second areas, and a plurality of third areas, the one or more first areas including a first plurality of pixels, each one or more first areas comprising the plurality of second areas including a second plurality of pixels fewer than the first plurality of pixels, and each second area of the plurality of second areas comprising the plurality of third areas including a third plurality of pixels fewer than the second plurality of pixels, and wherein identifying the one or more objects is based, in part, on sequentially analyzing each image frame based on the hierarchical data structure from the one or more first areas to the plurality of third areas.

* * * * *